(12) United States Patent
Chattey

(10) Patent No.: US 6,845,873 B1
(45) Date of Patent: Jan. 25, 2005

(54) CRANE APPARATUS EQUIPPED WITH CONTAINER SECURITY SCANNING SYSTEM

(76) Inventor: Nigel Chattey, 22 Cedar Lawn Rd., Irvington-on-Hudson, NY (US) 10533-1924

( * ) Notice: Subject to any disclaimer, the term of this patent is extended or adjusted under 35 U.S.C. 154(b) by 33 days.

(21) Appl. No.: 10/621,475

(22) Filed: Jul. 17, 2003

(51) Int. Cl.[7] .............................................. G01N 23/04
(52) U.S. Cl. ...................... 212/270; 212/271; 212/325; 378/57; 414/140.3
(58) Field of Search ................................ 212/270, 271, 212/325; 378/57; 414/140.3

(56) References Cited

U.S. PATENT DOCUMENTS

| | | | | |
|---|---|---|---|---|
| 5,838,759 A | * | 11/1998 | Armistead | 378/57 |
| 5,910,973 A | * | 6/1999 | Grodzins | 378/57 |
| 6,058,158 A | * | 5/2000 | Eiler | 378/57 |
| 6,192,104 B1 | * | 2/2001 | Adams et al. | 378/90 |
| 6,542,580 B1 | * | 4/2003 | Carver et al. | 378/580 |
| 2003/0108150 A1 | * | 6/2003 | Franke | 378/57 |
| 2003/0201394 A1 | * | 10/2003 | Peoples | 250/336.1 |

* cited by examiner

Primary Examiner—Thomas J. Brahan
(74) Attorney, Agent, or Firm—Adams & Wilks

(57) ABSTRACT

Crane apparatus is equipped with a container security scanning system for scanning containers for radioactive material, such as neutron or gamma ray emissions. The crane apparatus has a crane for unloading containers from a marine vessel and placing the containers on a deck located at the portal girder level of the crane and for transferring the containers from the deck to another location. The container security scanning system comprises one or more scanning units disposed on the deck, each scanning unit having one or more scanning platforms for supporting a container such that a bottom of the container is vertically spaced from the deck. A scanning device is movable beneath the container in a space between the underside of the scanning platforms and the deck for scanning the container to detect whether radioactive material is present. Existing cranes can be retrofitted with the container security scanning system, and newly manufactured cranes can be upgraded to include such a system.

52 Claims, 16 Drawing Sheets

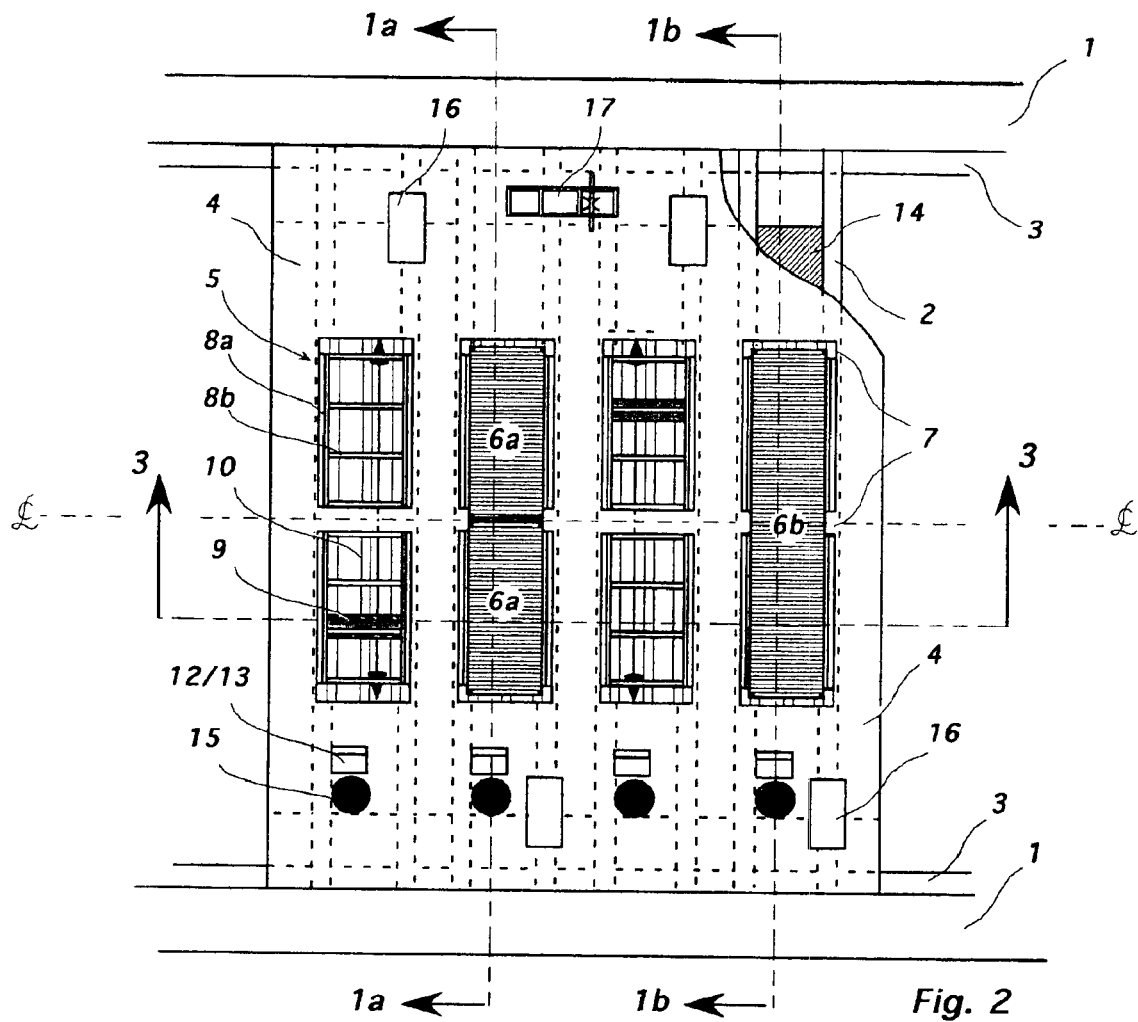
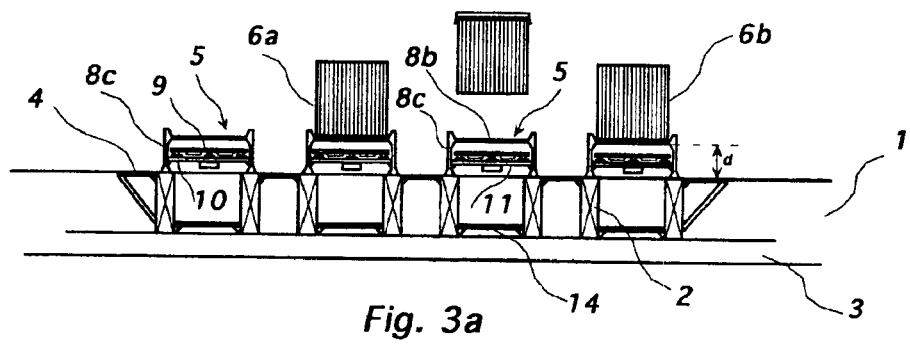
Fig. 2
Fig. 3a

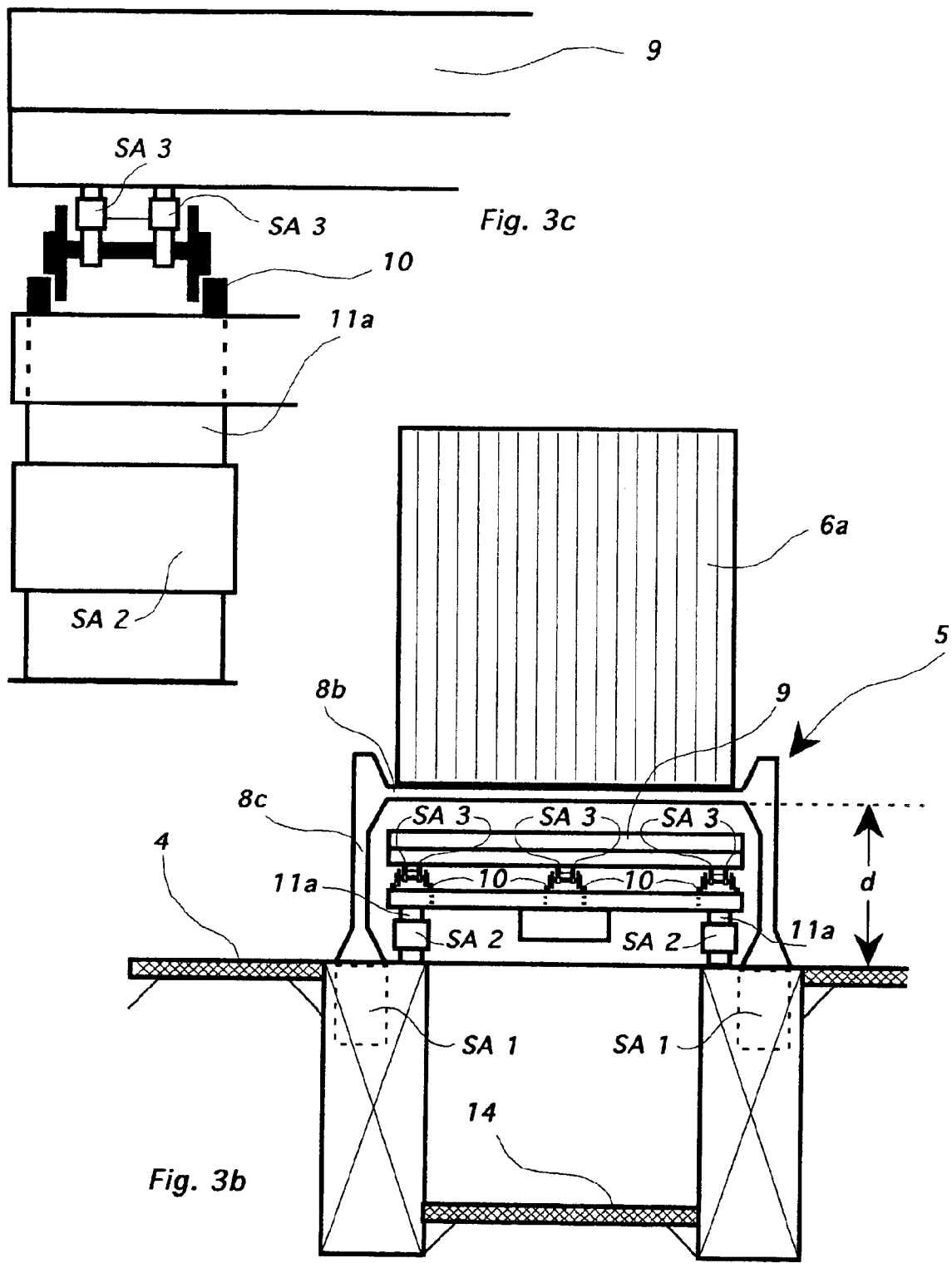

CRANE APPARATUS EQUIPPED WITH CONTAINER SECURITY SCANNING SYSTEM

BACKGROUND OF THE INVENTION

The present invention relates generally to container cranes, and more particularly to a crane apparatus equipped with a container security scanning system for scanning containers during transshipment thereof between transportation modes.

Three major problems are increasingly plaguing older marine container terminals in densely populated regions:
1. Security issues.
2. Congestion due to limited terminal space.
3. Environmental problems caused by diesel emissions.

Security Issues

Containers entering seaports now represent a security risk. Most, if not all, incoming containers now need to pass through detection devices in order to determine if they are radioactive: Specifically to detect for radioactive material, such as may be in "dirty" bombs or nuclear devices. It may already be too late, however, if radioactivity is only detected after a container has been unloaded, especially in a densely populated seaport such as Los Angeles, Seattle or New York.

For this reason, the U.S. Department of Homeland Security is now attempting to solve the problem by installing detection systems at container origin shipment locations overseas, such as in China, Malaysia, etc. At best, this type of solution can address only a small percentage of the seven million containers coming into the U.S. in any one year. In addition, there is no way that the reliability of these overseas origin detection centers can be adequately monitored. The risk of non-compliance is great indeed.

One solution to the problem would be to scan or screen inbound containers at locations away from densely populated seaports and consumption areas. This can be done in one of two ways: Firstly at locations on land, away from such population centers; or secondly, where such locations are not readily available, which is generally the case, at offshore locations including man-made islands.

Congestion Due to Limited Terminal Space

The volume of worldwide containerized cargo is increasing faster than is the capacity of many of the world's conventional marine container terminals. The problem is being compounded by a shortage of terminal space and increasing congestion caused by standard type terminal operations, i.e., the six or more separate container handling operations required for the movement of containers within and around the terminal from ship to stacks, within stacks, and from stacks to trailer-trucks. One solution to this problem can come from eliminating, to the maximum extent possible some of these six or more separate handlings of containers traditionally performed within terminals.

Environmental Problems Caused by Diesel Emissions

The problem of diesel powered emissions from terminal yard equipment and truck-trailers serving container terminals, and compounded by traffic congestion, has reached an expensive level. A marine container terminal under construction in Los Angeles, for China Shipping Corporation, has been ordered by the courts to pay $50 million in additional costs to retrofit the terminal in order to reduce its diesel emissions.

Standard marine container terminals rely to a great extent on diesel powered equipment of all kinds, i.e., trailer-trucks, rubber-tired gantries (RTG's), straddle carriers, reach-stackers, top-picks, etc. A significant reduction in diesel emissions can be achieved by:
1. Eliminating, to the maximum extent possible, all diesel powered operations.
2. Introducing new, integrated container logistics and handling systems that are powered entirely by electric motors rather than by internal combustion engines.

SUMMARY OF THE INVENTION

One object of the present invention is to provide a crane apparatus that overcomes the aforementioned problems prevalent at existing marine container terminals.

Another object of the present invention is to provide a crane apparatus having a container security scanning system for performing security scanning of containers during transshipment thereof between transportation modes and without ground placement of the containers.

A further object of the present invention is to provide a crane apparatus having a container security scanning system that is efficient, rapid, accurate and highly reliable.

Another object of the present invention is to provide a crane apparatus equipped with a container handling and security scanning system and powered by electric motors thereby significantly reducing, or possibly eliminating, diesel emissions at the marine container terminal.

Another object of the present invention is to provide a crane apparatus having a container security scanning system for performing security scanning of containers during direct transshipment thereof from marine vessels to rail-cars without ground placement of the containers.

A further object of the present invention is to provide a crane apparatus equipped with state-of-the-art scanning/detecting technology for performing security scanning of containers to determine the presence of radioactive material.

Another object of the present invention is to provide a crane apparatus equipped with a container security scanning system that minimizes the transfer time of containers during transshipment thereof between transportation modes by provision of fixed scanning units mounted on a scanning deck and platform constructed at the portal girder level of the crane apparatus.

A further object of the present invention is to provide a method for the security scanning of containers and their direct transshipment between transportation modes without the need for ground placement.

Another object of the present invention is to provide a container security scanning system that can be retrofitted to existing ship-to-shore container cranes and/or installed to upgrade similar newly manufactured cranes.

A further object of the present invention is to provide a method by which any existing ship-to-shore container crane can be retrofitted, and/or any similar newly manufactured crane can be upgraded, by the installation of the container security scanning system according to this invention.

The present invention provides unique solutions to the three major problems facing container terminal operations. It enables:
1. Security scanning of all inbound containers, without the need for their ground placement.
2. Direct transshipment of containers between transportation modes without the need for ground placement.
3. Performing all these functions using only electrical power and thus eliminating all diesel emissions.

Security Scanning of All Inbound Containers

To be efficient and effective, from a port and terminal security standpoint, any radioactivity and/or gamma ray scanning of inbound containers has to be undertaken:

1. As soon as possible after the container leaves the ship; and
2. In a fixed and reliable setting.

The present invention encompasses a method whereby the radioactivity and/or gamma ray scanning of containers can be undertaken in marine terminals in the quickest, most cost-efficient and most reliable manner.

This invention minimizes the time the container is being transferred, from its position within the ship's hold to the position where it can be scanned, by the introduction of a scanning deck and fixed scanning units constructed, at the portal girder level, of ship-to-shore container gantry cranes.

A container security scanning system (subsequently described and designated S1) according to the present invention can be installed in any type of ship-to-shore container gantry crane, not only in single boom, single trolley/hoist cranes, but also in multi-boom and/or multi-trolley/hoist cranes.

Within the general arrangement of all types of ship-to-shore container cranes, the portal girder level is the optimum location for any weight addition to the cranes. At this location, the new center of gravity of a crane, and the additional static and dynamic loading resulting from the security function, do not compromise the stability of the crane, even when operating at maximum unloading rates.

The security scanning deck according to the present invention comprises one or more, and preferably four, individual scanning units. Each scanning unit is equipped with a radioactivity and/or gamma ray scanning device configured to move completely, from end to end, under each container placed upon it. The scanning device is also wide enough so that the entire volume of cargo in a container can be scanned to determine if the cargo in any particular container is "clean" or "dirty".

The scanning units in the present invention also provide for additional container buffer slots in the overall container handling system. This is an important advantage as the need to provide for as much buffer capacity as possible is already well established in the design of new and efficient marine container terminals.

The scanning deck and scanning units, according to the present invention, are preferably installed at the portal girder level of any standard type container ship-to-shore gantry crane. The scanning deck is designed to be large enough to not only accommodate personnel who monitor the container security scanning system, but also large enough to allow these same personnel to undertake two other important marine terminal functions at the same location, i.e., checking container documentation and, when necessary, unlocking/locking twist-locks.

In addition, the container security scanning system of the present invention is designed so that it can be installed also in direct intermodal transshipment cranes such as those disclosed and described in detail in my copending patent application Ser. No. 09/992,704 filed Nov. 14, 2001, the entire disclosure of which is hereby incorporated by reference.

Several embodiments of container security scanning systems according to the present invention, installed in such direct transshipment cranes, are described in detail in the subsequent disclosure and drawings. In these embodiments, the location and method of operation of the scanning deck and scanning units eliminates the need for ground placement of containers. Thus, the time otherwise required to place containers at ground level before they can be scanned is also eliminated.

The present invention provides a method by which any ship-to-shore container gantry crane can be made to scan, within seconds, the contents of any container placed on any of its scanning units. By use of the unique container security scanning system (S1) embodied in the present invention, all a vessel's containers can be scanned within the shortest possible time from when they leave the ship. With all cranes servicing a vessel so equipped, a ship's complete cargo of containers can be scanned quickly, reliably, and under controlled conditions while, at the same time, significantly reducing the time that vessel would otherwise have to remain in port.

Direct Transshipment of Containers Between Transportation Modes without the Need for Ground Placement As important as security scanning, is the need to reduce the congestion problems being encountered by many container terminals. Current logistics methods that require the handling of a single container six or more times before it leaves the terminal are inefficient both from a time and cost standpoint.

The crane apparatus embodied in the present invention eliminates such excessive time and cost in handling containers. It achieves this by the direct intermodal transshipment of containers between transportation modes. Further, it achieves this without the need for ground placement before the containers leave the terminal.

For example, embodiments of the crane apparatus according to the present invention enable direct transshipment between:

1. Container ships and marine modes including container feeder vessels, barges, ferries, etc.
2. Container ships and land transportation modes including:
   a) Rail-road mode such as single-stack and double-stack rail-cars of container unit-trains.
   b) Road mode such as trailer-trucks.
   c) Yard equipment mode such as:
      i) Multi-trailer sets (MTSs);
      ii) Automated guided vehicles (AGVs); and
      iii) Yard tractors.

In order to achieve these direct transshipment functions, the embodiments of crane apparatus according to the present invention are of a new and unique design in that they incorporate, as integral parts within the structure of the crane, multiple hoists, multiple booms, and multiple platforms.

Thus this crane apparatus, with its unique methods of container handling, can achieve both the direct intermodal transshipment of containers and their security scanning. Further, by eliminating the need for ground placement in either instance, the overall unloading and terminal functions can be executed within the shortest possible time cycle.

Because of the importance being attributed to two particular applications of this crane apparatus, they are subsequently described in greater detail: Specifically, applications that refer to direct intermodal container transshipment and security scanning:

1. Onshore, between ocean-going container vessels and single-stack and/or double-stack container unit-trains.
2. Onshore and offshore, between ocean-going container vessels and container feeder vessels and/or tug-barge systems.

All Transshipment and Scanning Functions Performed by Electrical Power thus Eliminating any Diesel Emissions One important aspect of the crane apparatus of the present invention, and of its methods of operation and container handling, is that it achieves all its direct intermodal transshipment and container security scanning functions without generating any diesel emissions. This significant environmental benefit is achieved because all equipment operations are electrical and thus devoid of any diesel power generation.

All crane functions are powered by electric motors, i.e., crane drive motors that drive the cranes back and forth along their rails, trolley motors (whether for rope or machinery trolleys), spreader winch hoist motors, scanning device motors that drive the scanning devices back and forth under the scanning units, boom hoist motors, and personnel elevator hoist motors. Thus, all direct transshipment and security scanning functions are powered by electric motors.

The main electricity supply to these motors is supplied by underground live wires. These live wires are buried and laid adjacent to the grade level rails on which the cranes run. The electrical connection between the cranes and the live wires is maintained by electrical contacts fixed to the cranes, which provide constant contact with the live wires as the cranes move back and forth along their rails.

In the instances where over-the-ground vehicles have to be used in conjunction with the cranes, these are preferably 1-over-1 shuttle carriers. Unlike other diesel powered over-the-ground terminal equipment, 1-over-1 shuttle carriers can lend themselves, most economically, to conversion to an all electrical operation.

In summary, the various embodiments of the present invention each constitute an integrated, container logistics unloading, security scanning, and direct transshipment system that is not only cost and time efficient, but also in one that is environmentally friendly in that it generates no diesel emissions.

The foregoing as well as other objects, features and advantages of the present invention will become readily apparent to those of ordinary skill in the art upon a reading of the following detailed description of the invention when read in conjunction with the accompanying drawings.

BRIEF DESCRIPTION OF THE DRAWINGS

FIG. 2 is a plan view of the overall scanning deck of the crane apparatus of FIG. 1 on which there are, for example, four scanning units, with two having containers in scanning position and two being empty, awaiting containers.

FIG. 3a is a cross-sectional elevational view taken along section line 3—3 of FIG. 2 (at right angles to the wharf, quay or pier face) of the scanning deck at the portal girder level of the ship-to-shore container gantry crane.

FIG. 3b is an enlarged cross-sectional elevational view showing another embodiment of the scanning units used in the container security scanning system S1 of the present invention.

FIG. 3c is an enlarged cross-sectional elevational view of a portion of 3b.

FIGS. 7a and 7b show the crane apparatus mounted on a standard-type pier and together show the scanning and transshipping of containers from a container vessel directly to the railway mode such as, for example in this case, to single-stack and double-stack rail-cars comprising cuts of container unit-trains standing on the pier on railway tracks immediately under the cranes, again without the necessity for ground placement.

FIG. 7b is an enlarged explanatory view of the sibling crane of FIG. 7a, showing in more detail the location of the container security scanning system S1.

DETAILED DESCRIPTION OF THE INVENTION

Figure 1A:
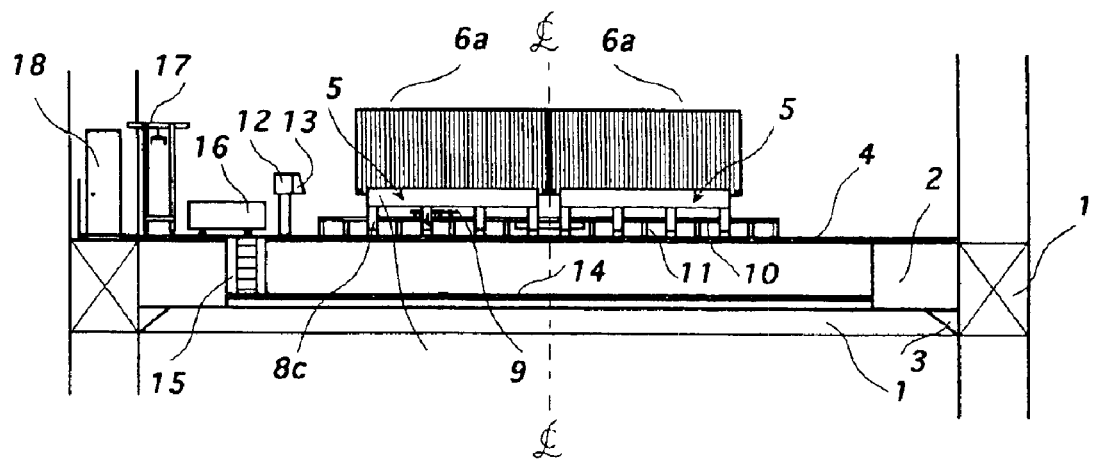
FIG. 1a is an elevational view, partly in section, taken along section line 1a—1a of FIG. 2 (parallel to the wharf, quay or pier face) of a crane apparatus equipped with a container security scanning system S1 according to the present invention showing two 20-foot containers (in a "twin-lift" configuration) in scanning position.
Figure 1B:
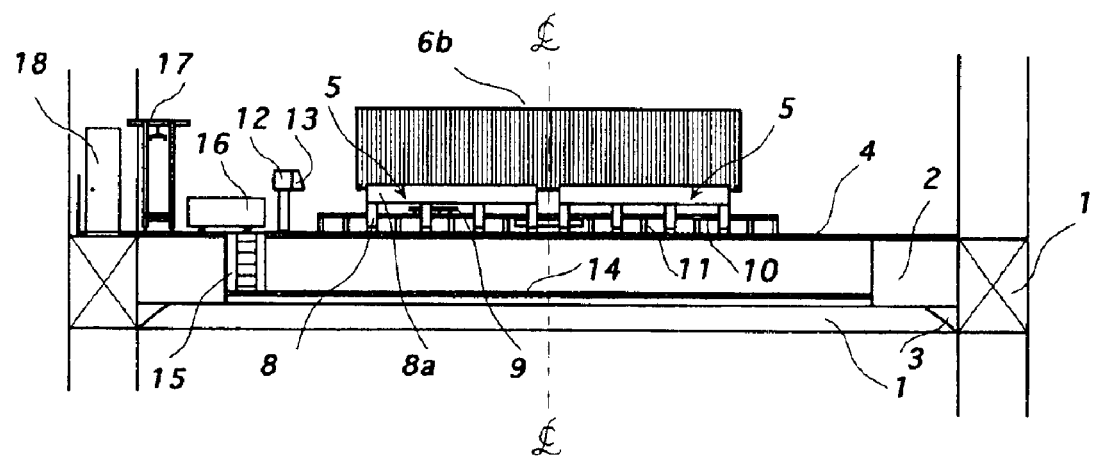
FIG. 1b is an elevational view, partly in section, taken along section line 1b—1b of FIG. 2 (parallel to the wharf, quay or pier face) of a crane apparatus equipped with the container security scanning system S1 according to the present invention showing a 40 foot container in scanning position.
Figure 1C:
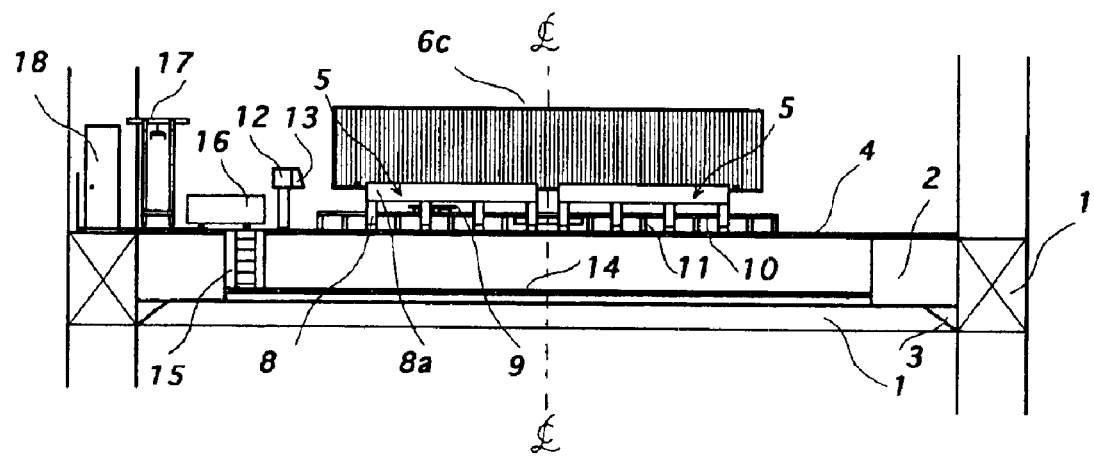
FIG. 1c is an elevational view, partly in section, (parallel to the wharf, quay or pier-face) of a crane apparatus equipped with the container security scanning system S1 according to the present invention showing a 40+ foot container in scanning position.

The container security scanning system S1 of the present invention enables the radioactivity and/or gamma ray scanning of cargo containers to be undertaken as soon as possible after they are lifted out of the container ship or vessel. This is achieved by the placement of one or more scanning units on a scanning deck constructed at the portal girder level of the ship-to-shore gantry crane. At such a location, the time interval between the container being in the ship and being placed in a position ready for scanning is minimized. FIGS. 1a, 1b and 1c show cross-sectional elevations (parallel to the wharf, quay or pier face) of a container security scanning system S1 according to the present invention located at the portal girder level of the ship-to-shore container gantry crane.

In accordance with the present invention, the container security scanning system S1 consists of one or more scanning units, the number of which will depend primarily on the size of the crane apparatus and the volume of containers it is designed to handle. The scanning units are preferably arranged in side-by-side relation on a scanning deck of the crane apparatus, and each scanning unit is designed to accommodate any single 40 foot or 40+ foot standard-sized containers (or two end-to-end 20 foot containers).

Each of the scanning units comprises one or more scanning platforms disposed in end-to-end relation for receiving thereon single 40 foot or 40+ foot containers (or two end-to-end 20 foot containers), and a scanning device mounted on a trolley that rides along rails mounted by supports beneath the scanning platforms. The scanning device rides along the rails beneath the scanning platforms to scan the contents of a container situated on the scanning platforms. The scanning units will be described in more detail hereinafter with reference to FIGS. 3a–3c.

FIGS. 1a, 1b, 1c show, by way of example, the container security scanning system S1 being used to scan the three different types of containers most commonly in use, i.e.:

1. In FIG. 1a, two 20 foot containers (in a "twin-lift" position).
2. In FIG. 1b, a single 40 foot container.
3. In FIG. 1c, a 40+ foot container.

FIGS. 1a, 1b and 1c also show one method of constructing and supporting a scanning deck 4 at the level of main portal level girders 1 in a ship-to-shore container gantry crane. The portal level girders 1 are at right angles to the wharf, quay or pier face. Cross beams 2 are welded at either end to the girders 1, and the cross beams 2 are further supported by supports 3 welded along their faces to the girders 1. Whatever the exact method of beams and supports used, the structure must be strong enough to support the scanning deck 4.

Additionally, the structure must be strong enough to absorb, without failure, the static and dynamic loads from fully loaded containers being placed on the structure in quick succession, under sustained operating conditions. Additionally, the structure must be strong enough to absorb the impact load of a loaded container possibly being dropped onto the scanning deck 4 from above by a trolley/hoist/spreader of the ship-to-shore gantry crane.

FIG. 1a shows one scanning unit consisting of two scanning platforms 5 on the scanning deck 4. The scanning platforms 5 are dimensioned and configured to receive thereon two 20 foot containers 6a which have been been lifted together as a "twin-lift" and positioned on the scanning platforms 5 ready for scanning.

FIG. 1b shows one scanning unit consisting of two scanning platforms 5 on the scanning deck 4, wherein one 40 foot container 6b is positioned ready for scanning.

FIG. 1c shows one scanning unit made up of two scanning platforms 5 on the scanning deck 4, wherein one 40+ foot container 6c is positioned ready for scanning.

The need to provide a minimum number of two scanning platforms 5 within each scanning unit now becomes apparent. Such a configuration, as shown in FIGS. 1a, 1b and 1c, enables operators to handle twist-lock operations at the four central locations resulting from there being two 20 foot containers in a twin-lift position on any set of two scanning platforms 5.

The scanning platforms 5, as best shown in FIGS. 2 and 3a, are comprised of support beams 8a, 8b, 8c connected together in a grid-like structure. Each scanning platform 5 has a pair of longitudinal or lengthwise support beams 8a interconnected at opposite ends, as well as at integrals along their lengths, by a series of transverse or widthwise support beams 8b to define a rectangular platform. A plurality of upstanding support legs 8c are connected to the support beams 8a, 8b to support the scanning platform 5 in an elevated position on the scanning deck 4, with the underside of the scanning platform 5 spaced a given distance d from the topside of the scanning deck 4. The distance d is also a function of the optimal height that twist-locks (on containers ready for scanning on the scanning platforms 5) are above the scanning deck 4. Specifically this distance relates to the optimal height for operators to most efficiently insert or remove twist-locks from the containers.

The scanning platforms 5 are designed in such a manner that the distance d is sufficient to permit the unimpeded passage of radioactivity and/or gamma ray scanning devices 9 mounted on rails 10 beneath the scanning platforms 5. The rails 10 are mounted on support members 11 and are designed to enable the scanning devices 9 to move in either direction along the rails 10 under the entire length of, and extending beyond the ends of, the scanning platforms 5 and beyond the ends of any containers 6a, or 6b or 6c placed on them. Such a configuration (as will be discussed in more detail later) allows for the scanning devices 9 to be removed for maintenance, even if containers still remain above them in scanning position on their scanning platforms 5. The scanning platforms 5 can be built as a single, integral, structure, or can be built in sections that can be arranged so as to form scanning platforms 5.

One important design function of this invention should also be noted. As shown in FIG. 2, the center line of the scanning deck 4, and the center line of each scanning unit on the scanning deck 4, are in the same plane and run exactly below the center line of the boom, or booms, of the ship-to-shore container gantry crane.

The movable radioactivity and/or gamma ray scanning devices 9 are powered to move in both directions along the rails 10. The power systems used in order to achieve such movement can be any one of several systems available, including the linear induction or maglev type. However, the best suited, most reliable, and most easily serviced and maintained power system, is one that involves standard electric motor drives integral with each scanning device 9.

The scanning device 9 may be of known construction and comprises one or more detectors for detecting gamma ray and/or neutron emissions characteristic of radioactive materials and converting the detected emissions into corresponding electrical impulses during rapid scanning by the detectors beneath a container. Preferably, the detectors are designed to detect any one of five specific radioactive isotopes which are enumerated in Senate Bill 193 and in directives from the U.S. Department of Homeland Security. The scanning device 9 preferably has two detectors, a gamma ray detector for detecting gamma ray emissions and a neutron detector for detecting neutron emissions. Typical examples of such detectors are the gamma ray detector Model No. JPM-12A Gamma available from Canberra, and neutron detector Model No. JPM-31A Neutron also available from Canberra. These two detectors were developed by Los Alamos National Laboratory in collaboration with Canberra (a private group) and meet the American Society of Testing and Materials (ASTM) guidelines for establishing the performance of portal detectors as provided for by the U.S. Department of Energy and the Nuclear Regulatory Agency. One advantage of using such detectors, which can be modified to meet the scanning requirements of the present invention, is that suitable electronics and software have already been developed that enable both the gamma ray and neutron detection results to be viewed on the same display monitor. Thus these two detectors provide a commercially available detection system for portal screening of containers at ports of entry that enables for simultaneous dual-scanning and detection and thus provides for maximum detection capability.

FIG. 3a shows other important, and unique, design functions of the container security scanning system S1. Specifically, design functions that enable the use of the widest possible scanning devices 9 that cover the entire width of any container 6a, 6b or 6c being scanned. The scanning devices 9 (as seen more clearly in FIG. 2) are also designed to run in one or preferably both directions under the full length of any container being scanned.

These design functions thus encompass an important method for security scanning purposes whereby any scanning device 9 can scan the entire cargo volume within any container placed on the scanning unit 5 above it. Each scanning device 9 can be electronically connected by readily available, state-of-the art equipment to a system operating console 12 and a radioactivity and/or gamma ray display monitor 13 located on the scanning deck 4, behind each scanning unit. As the scanning devices 9 are operated by operators at the consoles 12 to pass in one or both directions under the containers 6a, 6b or 6c on their scanning platforms 5, the operators can, from the same position, read the display monitors 13 and determine whether the containers 6a, 6b or 6c being scanned are "clean" or "dirty" in radioactive terms. Each scanning unit includes not only the scanning platforms 5 and the movable, rail-mounted scanning devices 9 but also the electronic consoles 12 and visual display monitors 13 which are connected electrically to the scanning devices 9.

Rapid and effective maintenance and repair (M&R) capability for the sensitive, high-technology equipment involved in scanning operations must also be an essential part of any container security scanning system. Such maintenance and repair must be capable of being undertaken from both above, and below, the equipment. To enable maintenance and repair to be rapidly and efficiently undertaken from below the equipment, corridor walkways 14 are shown in FIGS. 1a, 1b and 1c as being mounted below each of the scanning units. Manholes and ladders 15 provide access to the walkways 14 in order that personnel can perform maintenance and repair from under the scanning devices 9.

Major maintenance and repair of the equipment and/or its replacement also requires open access to the equipment from above so that, when necessary, each of the scanning devices 9 can be lifted directly off its rails, even when containers remain in scanning position on the scanning units. For this purpose, as shown in FIGS. 1a, 1b, 1c and 2, a movable overhead gantry 17, sized to pass and work over the scanning platforms 5, is parked at one end on the scanning deck 4. A door 18 leads to a personnel elevator in one of the legs of the ship-to-shore container gantry crane. The door 18 and elevator are sized so as to allow for the scanning devices 9 to be moved (in up-ended position) between the scanning deck 4 and the wharf, quay or pier below.

FIG. 2 shows a plan view of one layout of the container security scanning system S1 according to the present invention. By way of example, FIG. 2 shows four scanning units consisting of eight scanning platforms 5 arranged in four sets of in-line pairs. Two sets of in-line pairs of scanning platforms 5 of two scanning units are shown without containers. One set of in-line pairs of scanning platforms 5 of another scanning unit is shown as being occupied by two 20 foot containers 6a (which have been lifted into scanning position by a twin-lift spreader), and one set of in-line pairs of scanning platforms 5 of the fourth scanning unit is shown as being occupied by one 40 foot container 6b in position for scanning.

As shown in FIG. 2, the rails 10 allow the scanning devices 9 to move in either direction under the entire length of containers 6a (in either single or twin-lift configuration) and under the entire length of containers 6b and 6c. In addition, the rails 10 are shown to extend beyond the ends of the platforms 5 and the ends of containers 6a, 6b or 6c. This allows the scanning devices 9 to be readily lifted, for maintenance and repair purposes, from the scanning units, even when the platforms 5 are occupied by containers in scanning position.

One important design function of the container security scanning system S1 should also be noted. As shown in FIG. 2 the center line of the scanning deck 4, and the center line of each scanning unit disposed on the scanning deck 4, are in the same plane and run exactly below the center line of the boom, or booms, of the ship-to-shore container gantry crane apparatus. Thus this configuration enables the trolley/hoist/spreader or trolley/hoist/spreaders in the boom, or booms, above the scanning deck 4 to drop or raise their containers precisely onto or from the center of each scanning unit. The particular situation where a single 20 foot container 6a has to be placed on the scanning platforms requires further discussion which is undertaken later.

Figure 4A:
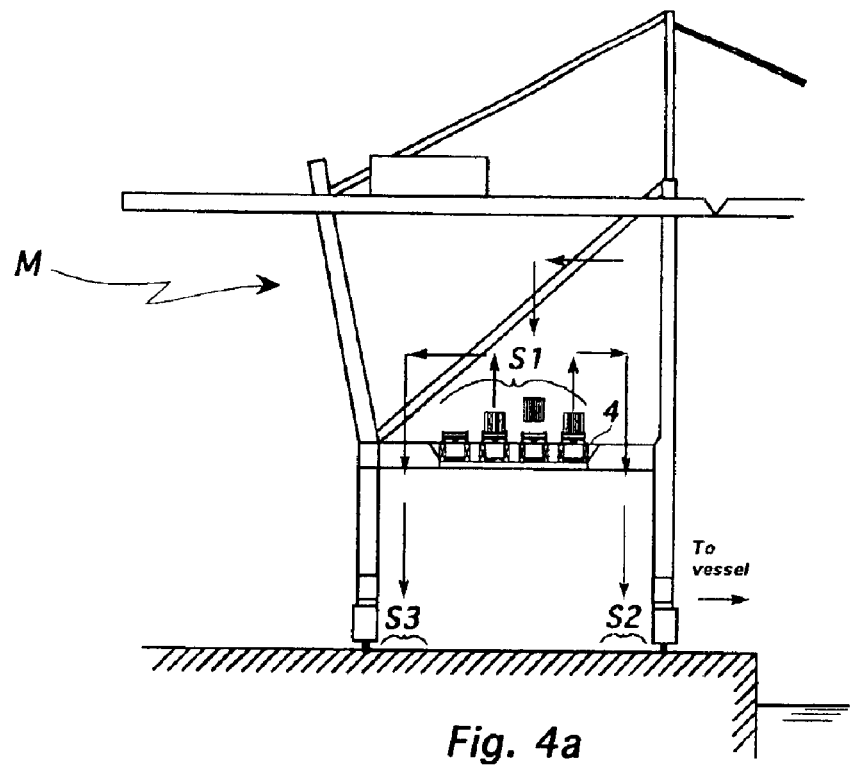
FIGS. 4a and 4b are schematic cross-sectional elevations (at right angles to the wharf, quay or pier face) of a standard type, single boom, single trolley/hoist, ship-to-shore container gantry crane showing alternative locations for the scanning deck and scanning units of the container security scanning system S1 of the present invention in such standard cranes.
Figure 4B:
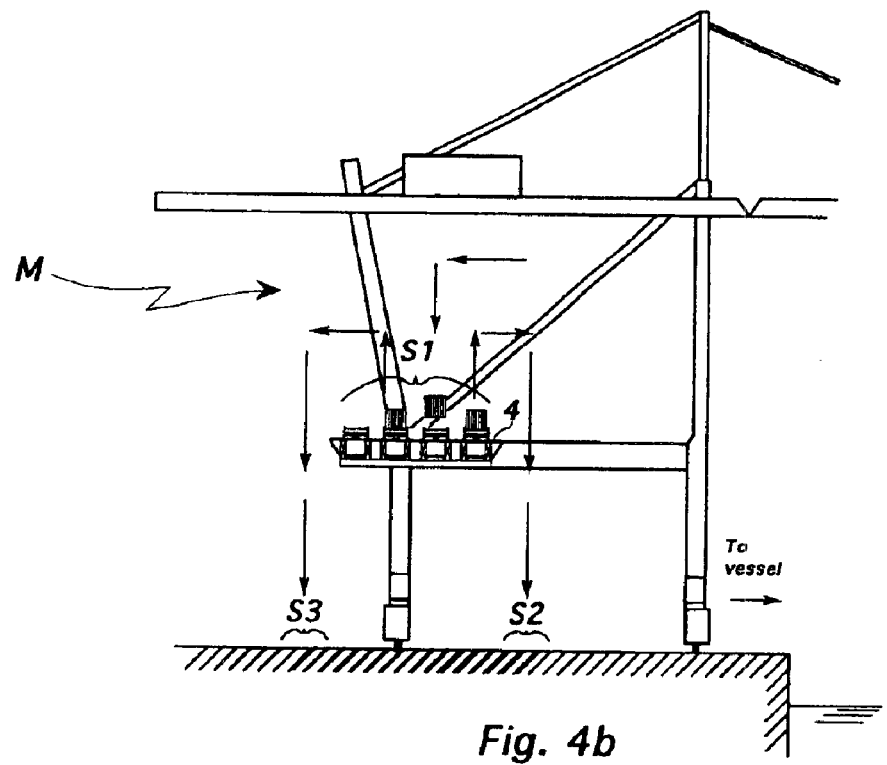

FIGS. 4a and 4b show how, most importantly in the present invention, the scanning deck 4 can be located at the portal girder level so as to retrofit any existing standard, single-boom, single-hoist ship-to-shore container gantry crane, or upgrade a newly manufactured crane of similar type. This enables, in any such cranes, containers 6a, 6b or 6c from any of the scanning platforms 5 to readily be lifted by a trolley/hoist/spreader above and dropped on either side of the scanning deck 4 to ground level, or dropped onto a pre-positioned tractor, trailer vehicle or other ground-level container handling equipment or system.

This will be especially important during times of a "red alert" at the terminal. For example, at such times, one side of the scanning deck 4 on each crane servicing a vessel, as well as the wharf, quay or pier area immediately below it, can be designated exclusively for dirty container handling and dispatch.

With plural in-line cranes simultaneously serving a vessel, a "red alert transportation corridor" S2 can be created along the wharf, quay or pier enabling any dirty containers to be dispatched as quickly as possible to a secure area on, or off, the terminal assigned to receive and further process such dirty containers. By way of example, this red alert transportation corridor is shown as S2 in all relevant figures. The "red alert vehicle" used in such instances will need such a clear corridor, unimpeded by other terminal ground equipment (such as shuttle or straddle carriers, or other ground-level container handling equipment or systems) in order to move any dirty containers expeditiously to the terminal's secure area.

During a red alert, with one side of the scanning decks 4 so designated, the other side of the scanning decks 4, as well as the wharf, quay or pier area immediately below it, can be designated as a "clean transportation corridor" S3. The necessary directions, as to which side of the scanning decks 4 should be used in a particular case, can be given by the operating personnel on the scanning decks 4 to the crane operator(s) in the control cabin(s) on the crane boom(s) above. By way of example, this clean transportation corridor is shown as S3 in all relevant figures.

This arrangement still enables clean containers to be unloaded from the vessel as quickly as possible, and clean containers can be lifted from any of the scanning units and dropped to the wharf, quay or pier level from the "clean" side of the scanning decks 4.

The operation of the crane apparatus of the present invention requires highly-trained technician-operators to work the scanning decks 4, scanning units, scanning devices 9, consoles 12 and display monitors 13. The relatively high wages of such operators can be offset, in part, if they are also responsible for the two other functions generally performed at this first stage of container terminal operations, i.e, checking the documentation and numbering of the inbound containers against the ship's manifest and customs documentation, etc., and, when and if required, also handling any twist-lock operations. From an operational standpoint, both these additional functions can be undertaken just as readily on the scanning deck 4, and any such multi-function operations becomes a matter for discussion between the terminal operators and labor at the terminal involved.

In the event a container is designated a "maverick" (because of faulty manifest or customs data, etc.) or for "re-stow" back aboard the vessel, the necessary information can be transmitted by the multi-function operators on the scanning deck 4, to a trolley/hoist/spreader operator(s) in the crane(s) above. The crane operator(s) can then move the container to a designated position (on the wharf, quay or pier below the crane), or directly onto a vehicle or other ground-level container handling system positioned under the crane and designated to receive such containers for subsequent movement to those terminal areas designated for further processing and handling of such maverick or re-stow containers.

FIG. 2 shows that, in order to facilitate twist-lock operations, the ends of the scanning platforms 5 are set back, thus enabling twist-lock removal (or insertion). FIG. 2 shows two typical locations of these set backs 7 which enable efficient removal or insertion of twist-locks on containers. Twist-lock cargo wagons 16 are located adjacent to each scanning platform 5. The cargo wagons 16 are movable on the scanning deck 4 so that, once filled with twist-locks, they can then be positioned for transfer back to the vessel by the crane. There are two other types of containers that may also require handling, namely:
1. Single 20 foot containers, and
2. Two 40 foot (or 40+ foot) containers being lifted "in tandem" by a single spreader.

Both of these types of container handling require a different configuration of scanning platforms.

When the ship-to-shore container gantry crane apparatus is expected to handle 20 foot containers as singles, this can be achieved as follows: Any scanning unit can be comprised of four (or more) shorter scanning platforms. The overall length of the scanning unit, however, will not be changed. No other design changes are necessary for the effective operation of this invention and its container security scanning system S1 as relates to the scanning of single 20 foot containers.

The effective scanning of two 40 foot or 40+ foot containers being handled in tandem requires a different solution. The different configuration of the scanning platforms necessary in order to handle such a situation is technically possible with this invention. However, the overall throughput capacity of the crane and its scanning units (in terms of containers per hour) will be negatively impacted. In practice, this could be to the point where any time savings gained by lifting 40 foot or 40+ foot containers in tandem will be more than offset by time losses resulting from the required different configuration of the platforms on the scanning deck 4. In summary, such different configuration will result in a more inflexible and time-consuming overall scanning process. For this reason, while a technical solution to scanning 40 foot or 40+ foot containers lifted in tandem is indeed possible with this invention, the need to show detailed drawings of such a solution does not appear to be warranted.

FIG. 3a shows a cross-sectional elevation taken along section line 3—3 of FIG. 2 of the scanning deck 4 and scanning units and scanning platforms 5, at right angles to the wharf, quay or pier face, at the portal girder level of the ship-to-shore container gantry crane. As an example, FIG. 3a shows one scanning unit being used to scan two 20 foot containers 6a (having been lifted as part of a twin-lift), one scanning unit being used to scan a single 40 foot container 6b and two scanning units and scanning platforms 5 empty, awaiting containers.

FIG. 3a also shows one method of constructing and supporting the scanning deck 4, on which the scanning platforms 5 are located. As described hereinabove with reference to FIGS. 1a–1c, the portal girders 1, carrying the deck 4, are at right angles to the wharf, quay or pier face. Cross beaus 2 are welded at either end to the girders 1, and the cross beams 2 are further supported by supports 3 welded along their faces to the girders 1. Such a configuration of girders 1, beams 2 and supports 3 provides the levels of strength and rigidity required for the scanning deck 4 and scanning platforms 5, which must be strong enough structures to absorb, without failure, the static and dynamic loads from loaded containers being placed on the scanning platforms 5 in quick succession, under sustained operating conditions, and, additionally, also strong enough to minimize, and absorb, the impact of a loaded container possibly being dropped onto the scanning deck 4 or scanning platform 5 from above by a trolley/hoist/spreader of the ship-to-shore gantry crane.

The scanning units together with their scanning platforms 5 are designed so that the scanning devices 9 (mounted on the rails 10 and supported by the support members 11) are enabled to move in either direction under the full length of, and extending beyond the ends of, any container placed upon them. The scanning platforms 5 are configured and dimensioned to enable the use of the widest possible scanning systems 9, i.e., ones that cover the entire width of any container being scanned. Thus the entire volume of cargo in any container can be scanned.

In the embodiment of FIG. 3a, each of the scanning units has the support members 11, which support the rails 10, connected directly to the scanning platform 5. When a container is lowered onto and contacts the scanning platform 5, impact forces are transmitted through the scanning platform to the scanning deck 4 as well as to the support members 11 and, in turn to the rails 10 and the scanning device 9. In order to prevent these impact forces from being transmitted to the scanning device 9, suitable shock absorbers (not shown) can be placed at desired locations to protect the scanning device 9. For example, shock absorbers can be interposed between the trolley wheels and the trolley, and high-energy shock absorbers can be installed in the cross beams 2 (that support the scanning deck 4) at locations beneath the support legs 8c of the scanning platform 5. The provision of such shock absorbers in this configuration will mitigate the impact forces, thereby reducing the magnitude of impact or shock forces applied to the scanning device 9.

FIGS. 3b and 3c show another embodiment of the scanning units. In this embodiment, the trolley rails 10 are mounted on support members 11a which are not directly connected to the scanning platform 5. Instead, the support members 11a are mounted directly on the scanning deck 4 in spaced-apart relation from the scanning platform 5. This arrangement is more effective than that shown in FIG. 3a in preventing impact forces generated by placement of a container on the scanning platform 5 from being transmitted to the scanning device 9.

As shown in FIG. 3b, high-energy shock absorbers SA1 are provided in the cross beams 2 (that support the scanning deck 4) at locations beneath the legs 8c of the scanning platform 5 for absorbing and dissipating a large portion of the impact energy. Additional shock absorbers SA2 are provided in the support members 11a and, if desired, shock absorbers SA3 may be provided between the trolley wheels and the trolley which carries the scanning device 9. FIG. 3c shows in more detail the placement of the shock absorbers SA2 and SA3. The shock absorbers SA1 are preferably hydraulic shock absorbers designed to withstand extremely heavy impact forces. The shock absorbers SA2 may likewise be of the hydraulic type, or may be a combination of hydraulic- and spring-types. The shock absorbers SA3 are preferably of the spring-type, such as coiled compression springs or leaf springs.

Rapid and effective maintenance and repair capability for the sensitive, high-technology equipment involved in scanning operations is essential. Such maintenance and repair must be capable of being undertaken from both above, and below, the equipment. To enable maintenance and repair to be rapidly and efficiently undertaken from below the equipment, corridor walkways 14 are mounted below all of the scanning platforms 5. In FIG. 3a, the walkways 14 are shown as being supported by supports welded along the cross beams 2.

FIGS. 4a and 4b show, for example, schematic cross-sectional elevations of a standard ship-to-shore container gantry crane M. Typically such standard cranes have one boom and one trolley/hoist. FIGS. 4a and 4b show, for example, how the container security scanning system S1 of the present invention can be mounted at two different locations at the portal girder level of the cranes M and show how a separation can be achieved in the handling of "dirty" versus "clean" containers.

FIG. 4a, for example, shows how a dirty container can be lifted from the scanning platforms 5 on the scanning deck 4 and dropped to the wharf, quay or pier level on the seaward side of the area under the crane M's portal (red alert transportation corridor S2) while clean containers can be lifted from the scanning platforms 5 and dropped on the landward side of the area under the cranes M's portal (clean transportation corridor S3). In this manner, clear transportation corridors are established for the subsequent handling (by ground equipment or systems) of each type of container.

FIG. 4b, for example, shows a similar path for dirty containers, i.e., their being capable of being dropped to the wharf, quay or pier level under the crane M's portal. However, by virtue of the scanning deck 4 being shifted to a position over the back legs of the crane M, clean containers can be dropped to the wharf, quay or pier level behind the back legs of the cranes. This arrangement provides for larger ground areas, and more buffer slots, for the handling of each type of container.

FIGS. 4a and 4b show how, with the sides of the scanning decks 4 on all cranes serving a vessel being designated "clean" versus "dirty", a clear red alert transportation corridor S2 can be created enabling dirty containers to be dispatched as quickly as possible to the secure area on, or off, the terminal assigned to receive and further process such dirty containers. The "red alert vehicles" used in such instances will need such a clear corridor, unimpeded by other terminal ground equipment or systems, in order to move any dirty containers expeditiously to the terminal's secure area. While the vessel still has to unload its other containers as quickly as possible, clean containers, once scanned, can be lifted off the scanning platforms 5 on the scanning decks 4 and dropped to the wharf, quay or pier level from the landward side of the decks 4, thus minimizing any delay in the vessel's overall unloading function.

Finally, while FIGS. 4a and 4b show the mounting of the container security scanning system S1 at the level of the main portal level girders of a standard type, single boom and single trolley/hoist/spreader ship-to-shore container gantry crane, the scanning decks 4, together with their support structures, can be mounted just as effectively on more complex types of ship-to-shore container gantry cranes, including cranes with multiple booms and/or multiple trolley/hoist/spreaders.

FIGS. 1–3 show the construction of the container security scanning system S1 in detail, while FIGS. 4a and 4b show the application of the system S1 in standard, single boom, single trolley/hoist/spreader, ship-to-shore container gantry cranes.

FIGS. 5–8 and 10–12 show the application of the container security scanning system S1 in direct intermodal transshipment container cranes, similar to those disclosed and described in my copending patent application Ser. No. 09/992,704 filed Nov. 14, 2001.

Figure 5A:
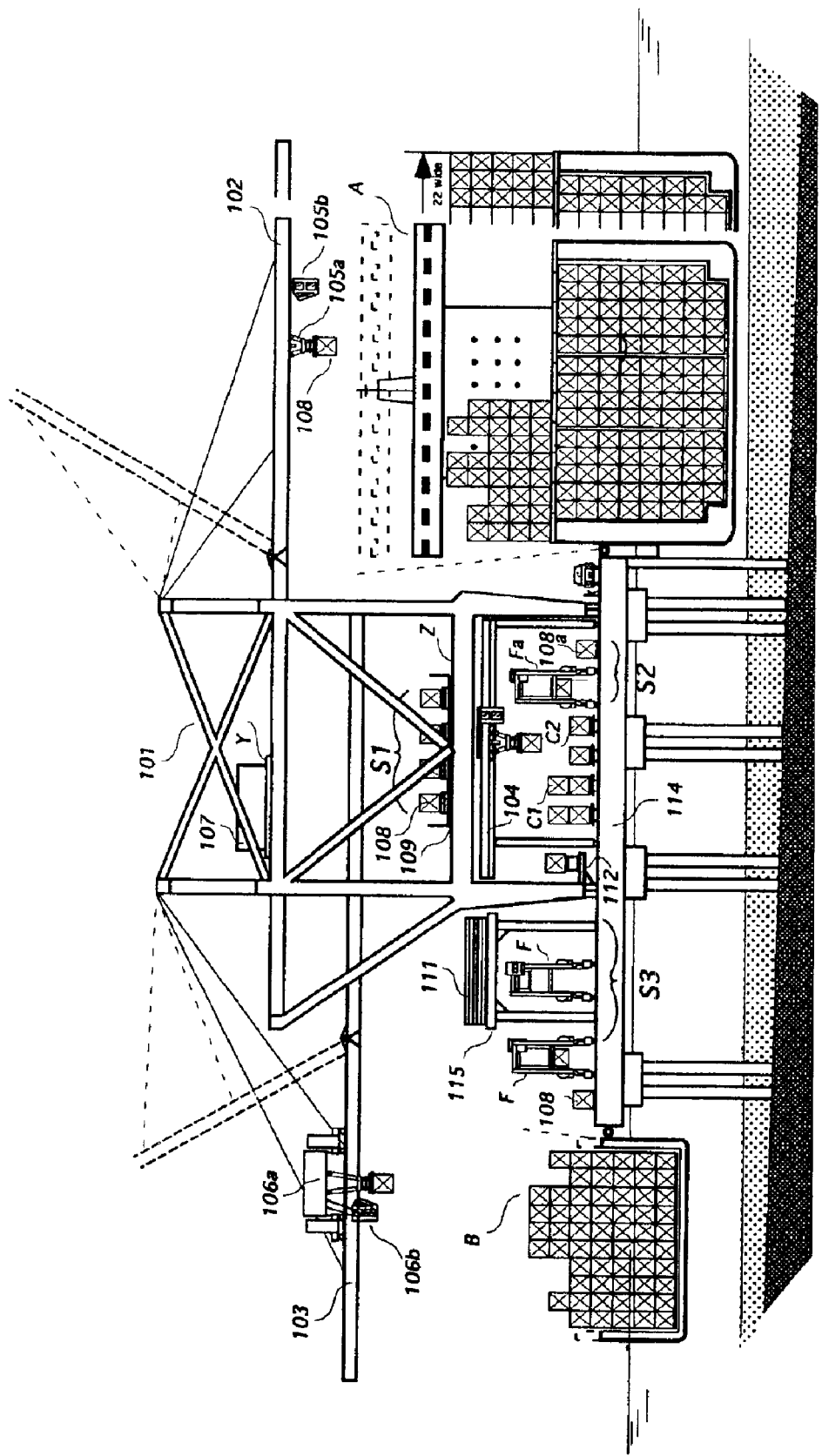
FIG. 5a is an explanatory elevational view, partly in section, of one embodiment of crane apparatus equipped with the container security scanning system S1 according to the present invention, showing the crane apparatus mounted on a standard-type pier or a man-made island dock constructed, for example, on the slab, plinth and piling principle, and illustrating the manner in which the crane apparatus is able to transship containers directly between various transportation modes without the necessity for ground placement.

As shown in FIG. 5a, a mobile parent quayside container crane 101 has two crane booms 102 and 103 placed on opposing sides thereof and built into, and part of, its overall structure. The boom 102 carries a rope trolley/hoist/spreader 105a (or alternatively a machinery trolley) and an independently mounted operator control cabin 105b. The boom 103 carries a machinery trolley/hoist/spreader 106a and an independently mounted operator control cabin 106b. At least two platform bearing structures Y and Z are built into the overall structure of the mobile parent quayside container crane 101. If the boom 102 carries a rope trolley/hoist/spreader, then a rope trolley/hoist driving motor and winch room 107 is located on the platform bearing structure Y.

In FIGS. 5–8 and 10–12, the container security scanning system S1 is located on a scanning deck/fixed platform 109. The platform 109 is mounted on the platform bearing structure Z and is designed so as to enable twist-lock crews to unlock, and lock, the twist-locks on the containers 108 when necessary.

In FIG. 5a, the parent quayside container crane 101, which is displaceable along the pier on its own rails, has associated with it a sibling rail-mounted gantry crane (RMG) 104, which is independently displaceable along the pier 114 on its own rails. The sibling RMG crane 104 is capable of operating under, and in conjunction with, the parent crane 101, but independently of it, for a given distance on either side of the parent crane, without interfering with the other parent quayside container cranes 101 and their sibling RMG cranes 104 (not shown) as they may also be operating on either side along the same pier 114.

The sibling RMG crane 104 is mounted on its own set of rails, independent of the rails upon which the mobile parent quayside container crane 101 is mounted. As such, the sibling RMG crane 104 can travel back and forth along the pier 114, under any position of its mobile parent crane 101 as, for example, while the parent crane 101 is in a fixed position unloading or loading a particular cell of a container ship. The actual distance that the sibling RMG crane 104 can travel along the pier 114, under and on either side of its parent crane 101, when the crane 101 is in a fixed position, however, is determined by the distance that similar sibling RMG cranes 104 are also working along the same pier 114 on either side under their respective parent cranes 101.

The parent crane 101 has a fixed receiving platform 112 for containers 108 on one side of, and fixed to the structure of, the crane 101. The platform 112 is also designed to enable twist-lock crews to unlock and lock the twist-locks on the containers 108 when necessary.

Figure 5B:
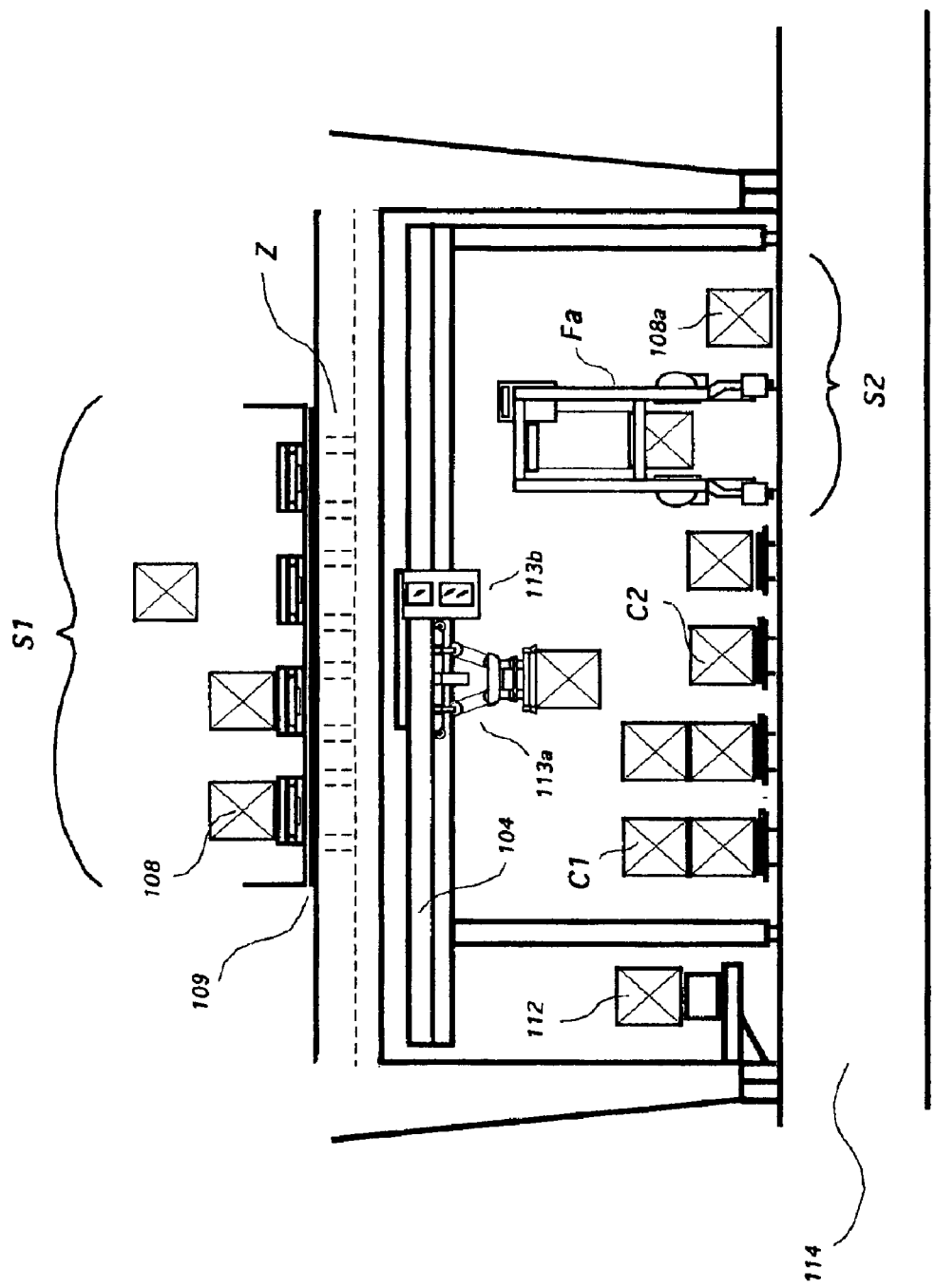
FIG. 5b is an enlarged explanatory view of the sibling crane of FIG. 5a, showing in more detail the location of the container security scanning system S1.

In the enlarged explanatory view of FIG. 5b, the sibling-RMG crane 104 is shown as having working within it, and operating at right angles to the rail-mounted movement of the crane 104, a trolley/hoist/spreader 113a and an operator control cabin 113b.

Figure 6A:
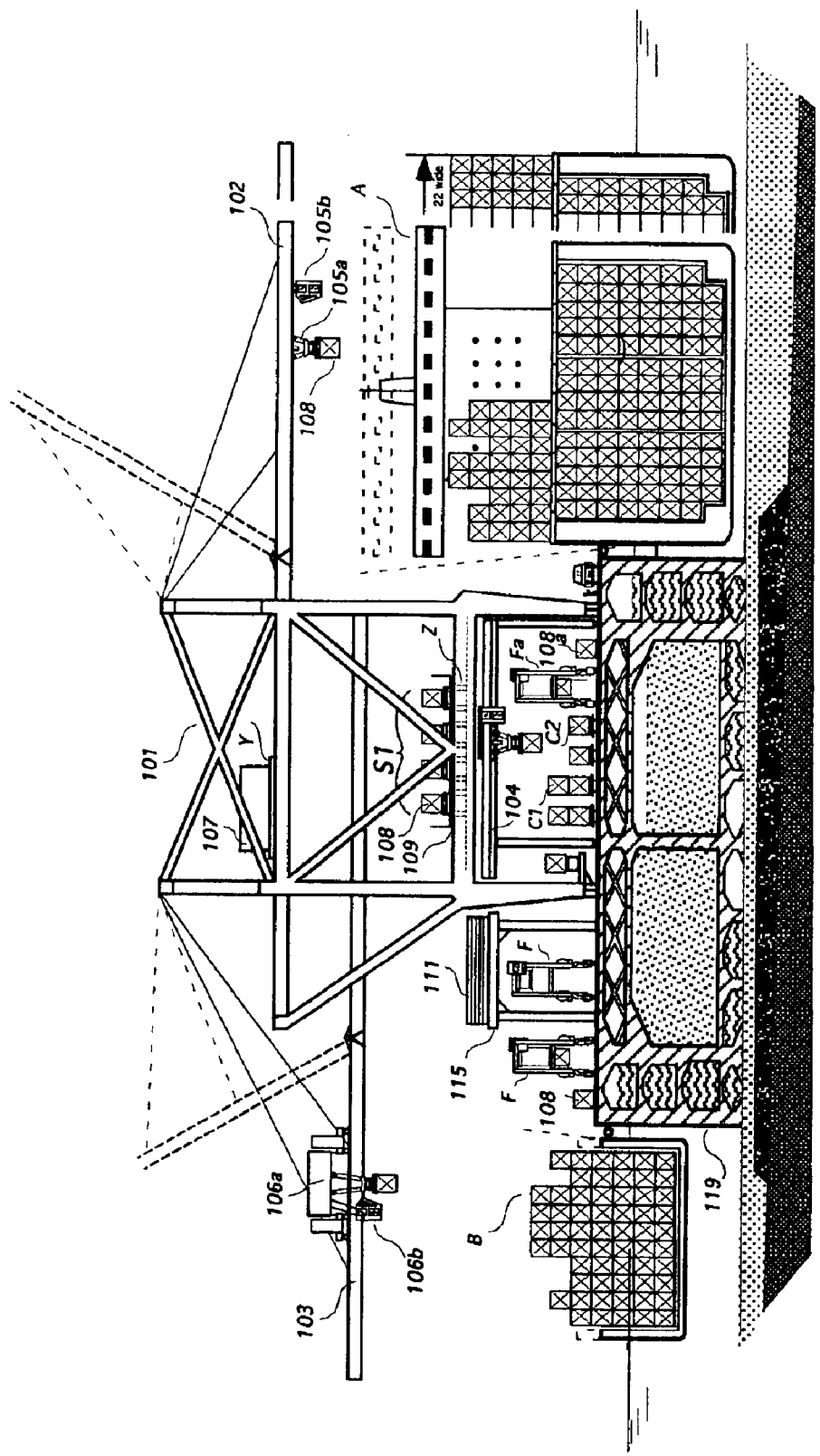
FIG. 6a is an explanatory elevational view, partly in section, of another embodiment of crane apparatus equipped with the container security scanning system S1 according to the present invention, showing the crane apparatus mounted on one or more caissons and illustrating the scanning and transshipping of containers directly between various transportation modes without the necessity for ground placement of the containers.

Each mobile parent crane 101, and each mobile sibling RMG crane 104 associated with it, together with their rails and power systems, are capable of being mounted on either offshore island docks or inshore piers, constructed as either standard type island docks or piers, for example, of the slab, plinth and piling type 114 as shown in FIG. 5a, or caisson island dock 119, as shown in FIG. 6a. For convenience of explanation, reference will hereinafter be made to simply a pier, and it is understood that each such reference includes within its scope both inshore piers and offshore docks.

In the embodiments of the invention shown in FIGS. 5a and 6a, and in order to lessen the width, and capital investment cost, of the pier 114, or the caisson 119, it is preferable to construct a raised platform 115 along the pier on which hatch covers 111 can be placed. The raised platform 115 not only shortens the cycle time for handling, stacking and un-stacking the covers 111 but also creates a clean transportation corridor S3 (under the platform 115) for use by over-the ground vehicles, such as 1-over-1 shuttle carriers F, etc.

It should be noted that the raised platform 115 is a stand-alone fixed structure running along the pier 114, or the caisson 119, and is in no way connected to the mobile parent crane 101, or to the mobile sibling RMG crane 104, both of which must be free to move past the platform 115, up and down the pier 114, or the caisson 119.

Figure 8:
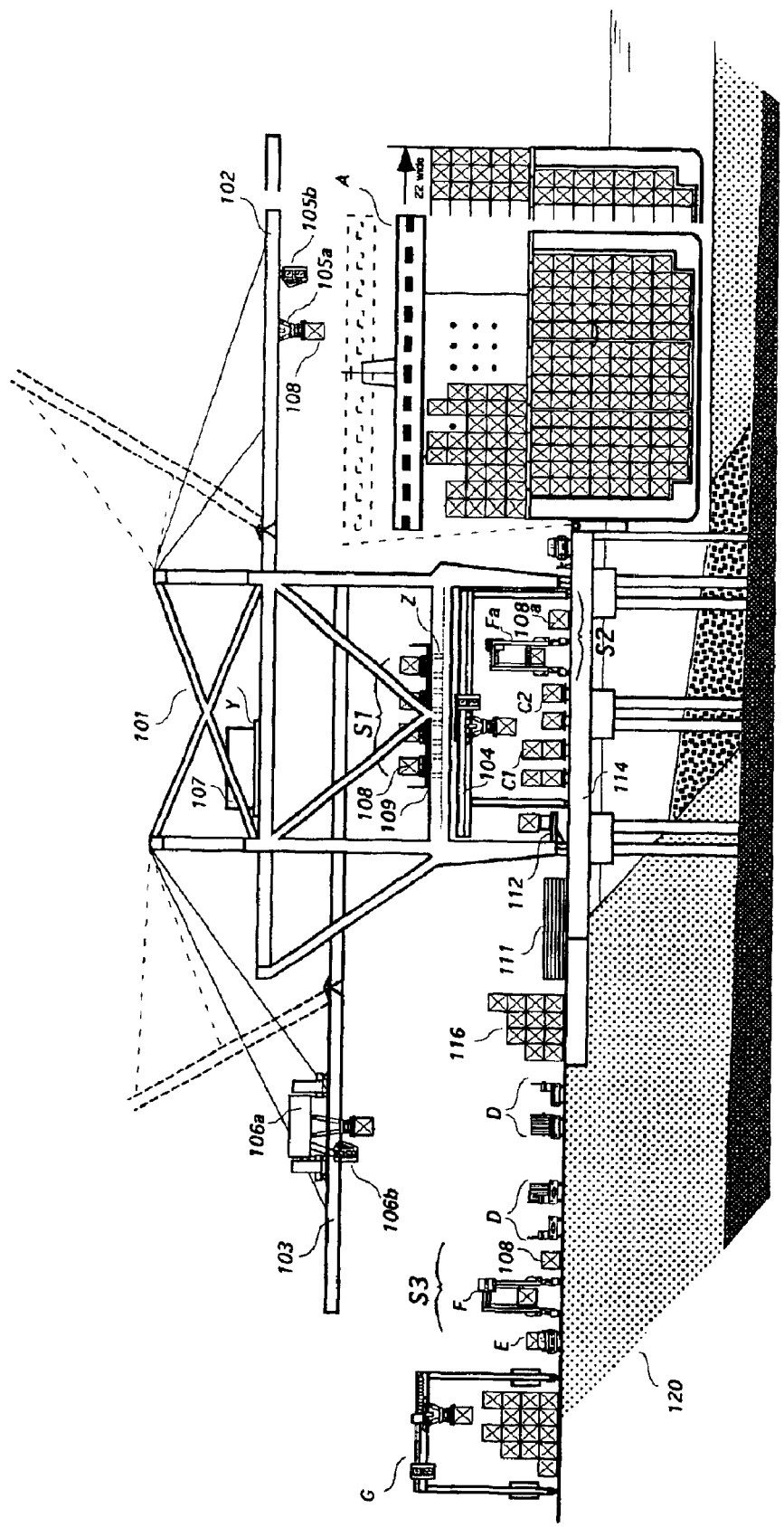
FIG. 8 is an explanatory elevational view, partly in section, of another embodiment of crane apparatus equipped with the container security scanning system S1 according to the present invention, showing the crane apparatus mounted on a wharf (or bulkhead wharf) constructed, for example, on the slab, plinth and piling principle.
Figure 10:
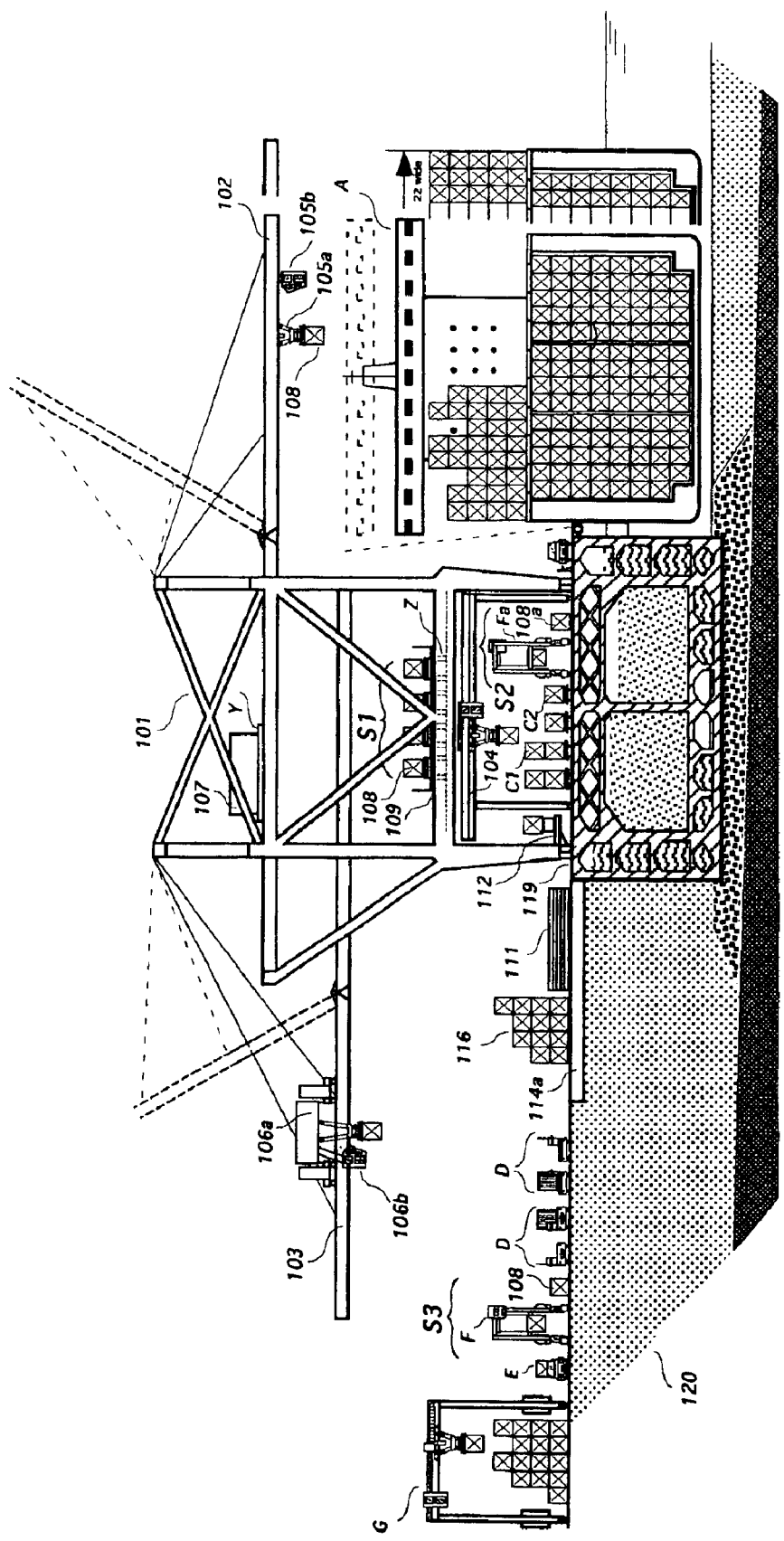
FIGS. 10 and 11 are explanatory elevational views, partly in section, of other embodiments of crane apparatus equipped with the container security scanning system S1 according to the present invention, showing the crane apparatus mounted on a wharf (or bulkhead wharf) constructed, for example, using caissons.
Figure 11:
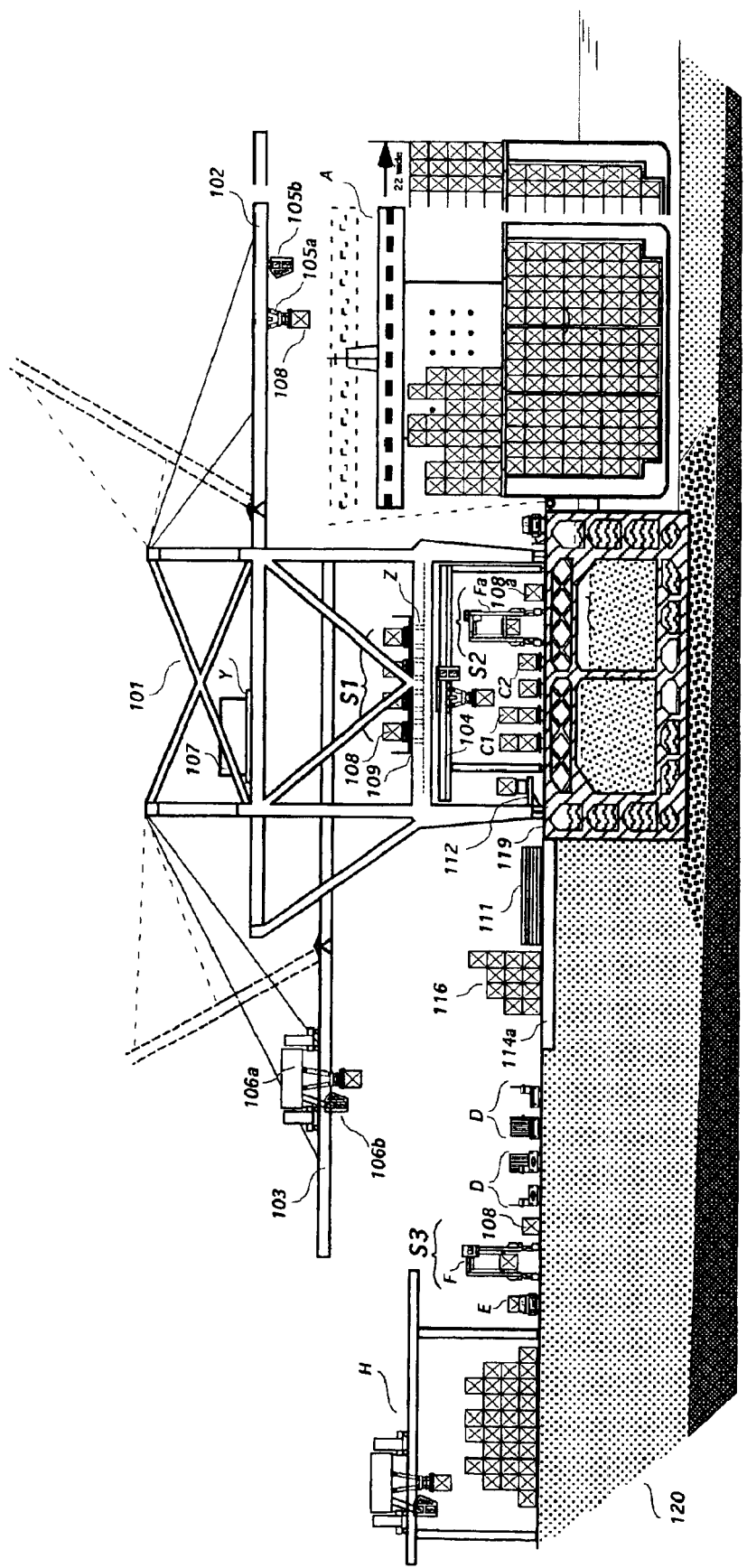

FIG. 5a shows an embodiment of the invention in which the mobile parent cranes 101 and their mobile sibling RMG cranes 104 are mounted on rails on a pier 114. Alternatively, as shown in FIG. 8, the mobile parent cranes 101 and their mobile sibling RMG cranes 104 can be mounted on rails on a wharf, or a bulkhead wharf 120, built either by conventional methods 114 or again, as shown in FIGS. 10 and 11 constructed by caissons 119. When the crane apparatus of the invention is placed on a wharf or bulkhead wharf as in FIGS. 8, 10 and 11, the option is available as to whether the raised platform 115, and the over-the-ground vehicle clean transportation corridor S3 that is under it, should or should not be constructed. This decision will depend on the layout of the backland of the terminal. If sufficient space is available, then the hatch covers 111 and containers 116 (awaiting re-stow aboard the container vessel A) can be stacked on the ground by the machinery trolley/hoist/spreader 106a on the boom 103, and the clean transportation corridor S3 can be located landside of the re-stow stacks.

Figure 5C:
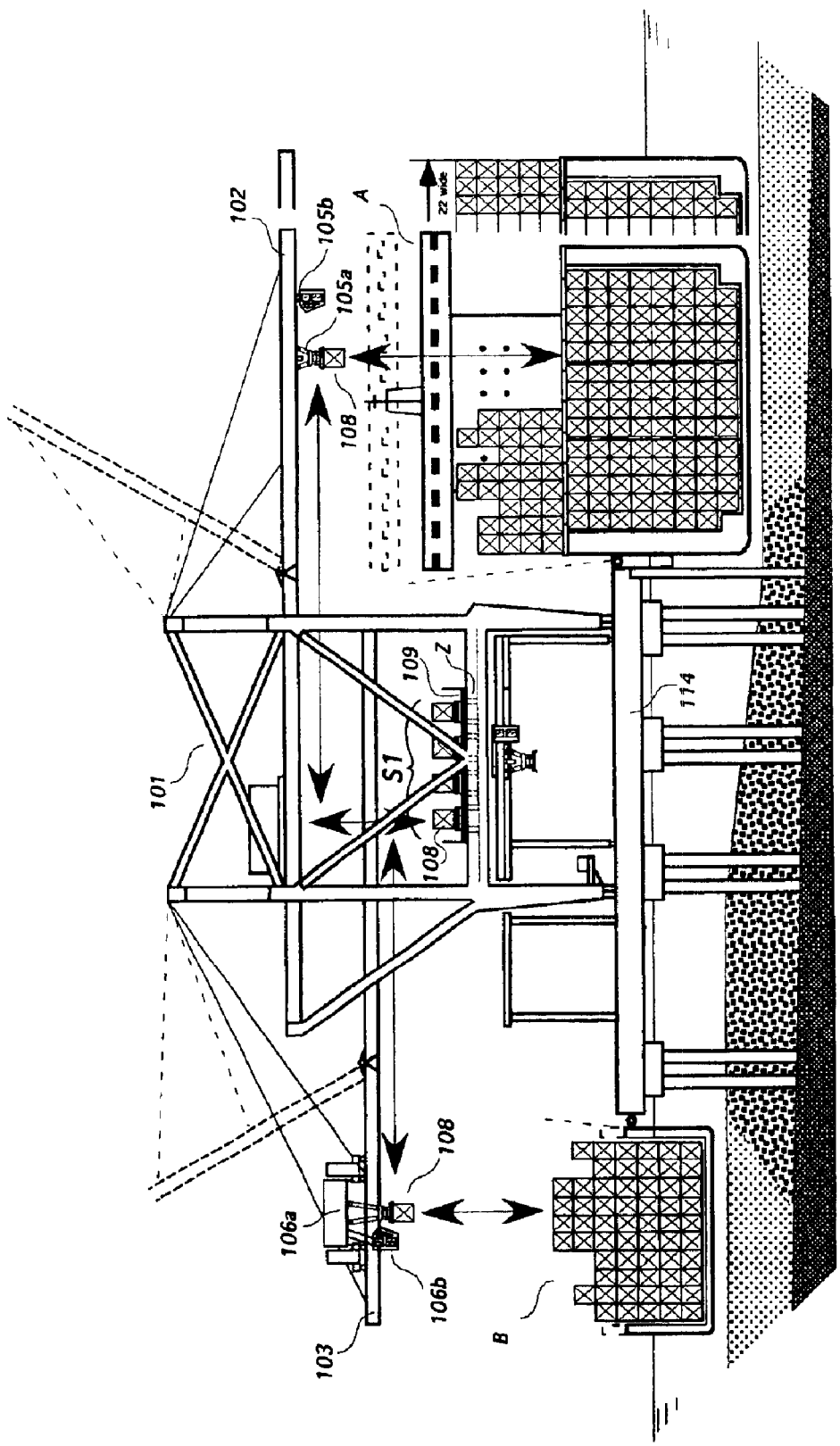
FIG. 5c is an explanatory elevational view, partly in section, of another embodiment of crane apparatus equipped with the container security scanning system S1 according to the present invention, showing the crane apparatus mounted on a standard-type pier or a man-made island dock and showing the scanning and transshipping of containers from a container vessel directly to other marine mode vessels such as, for example in this case, to a river/harbor barge or to a feeder vessel (or, as is more likely in the United States, a coastal tug-barge system), without the necessity for ground placement.

FIG. 5c illustrates an embodiment of the crane apparatus of the invention used to security scan and directly transship containers 108 across a pier 114 between a container ship A and other marine modes B, such as river/harbor barges, ferries, etc., and for example specifically in this case, to a container feeder vessel (or, as is more likely in the United States, to a coastal container tug-barge system).

It should be noted that, in all embodiments of this invention, the container security scanning function takes place without the need for ground placement of the containers being scanned. As such it is compatible within the overall direct intermodal container transshipment function of the cranes of which it is an integral part because these cranes also execute their direct intermodal container transshipment functions without the need for ground placement of the containers.

The cycle time for unloading a container is made up of basically two movements, vertical and horizontal. Over the same travel distance, and when acceleration and de-acceleration times are taken into account, vertical movements of containers take approximately twice as long as horizontal movements. As container ships have increased in size, the vertical movements over which a container has to move have also increased. When working such large vessels, the cycle time of a single-hoist dock-side container crane is now too long, i.e., at between 120 and 150 seconds on average in the United States.

If the cycle time is to be shortened, multiple hoists must cycle concurrently within the crane and, as importantly, these multiple hoists must operate with platforms within the crane. For example, in FIG. 5c the container security scanning system S1 is shown mounted on the scanning deck/fixed platform 109. The platform 109 being mounted on the platform bearing structure Z which is constructed as an integral structural part of the mobile parent crane 101.

The overall cycle time for transshipping a container 108 is shortened by the fact that the first trolley/hoist/spreader 105a on the boom 102 has only to move the container 108 out of the ship A to the platform 109, high up in the crane, for the container to be scanned. The travel distance thus being considerably shortened when compared to the distance that containers requiring ground placement would have to travel (when handled by standard single-hoist cranes of similar outreach).

From the container security scanning system S1 on the platform 109, the machinery trolley/hoist/spreader 106a on the boom 103 only has to move a container 108 (once it has been scanned) to the marine vessel B moored on the inside face of the pier. This movement is undertaken while the first trolley/hoist/spreader 105a on the boom 102 is returning to lift another container 108, from the container ship A, for placement on the container security scanning system S1.

When the crane apparatus in FIGS. 5–8 and 10–12 are operating under conditions of maximum synchronization, the average cycle time in transshipping containers should be as low as 50 seconds, i.e., less than half the time achievable by even state-of-the-art standard single-hoist ship-to-shore gantry cranes, such as those now being built in China by ZPMC.

The combination of the two trolley/hoist/spreaders 105a and 106a working in concert under the above-described sequence indicates that the mobile parent quayside container crane 101 (when directly transshipping containers 108 between a container ship A and other marine vessels B) should achieve a sustained lift rate in excess of 60 lifts an hour. For comparison purposes, 24 lifts an hour is considered a standard sustained rate in the United States for single-hoist ship-to-shore container cranes.

When the time for container security scanning is added to both systems, the time advantage is even greater in favor of the crane apparatus of this invention.

This increase in lift rate, and decrease in overall cycle time (especially when security scanning time is added) in the intermodal transshipping of containers, is of considerable economic and operational importance. This is especially true as it relates to the time taken in the management of the overall container supply chain. For example, deployment of a Maersk Class "S" or "K" container vessel, nominally rated at 6,800 TEU capacity, between Kaohsiung, Taiwan and the Port of New York, could see unloading/loading the entire cargo of such a vessel using the crane apparatus of the present invention in 48 hours or less, compared to 96 hours when using standard, single trolley/hoist/spreader cranes.

For a given annual supply chain volume of say 500,000 containers or more a year, the savings in this example, in port time each voyage, can result in being able to eliminate one entire vessel in the supply chain. At a $100+million capital cost per vessel (in addition to ship crew costs, fuel costs, port fees, etc.) the economic and operational incentives become very real in favor of multiple hoist/multiple platform cranes, and even more so in favor of the crane apparatus of the present invention.

In summary, it can be said that this invention encompasses a method by which both the security scanning and direct intermodal transshipment of containers between ocean carriers and other transportation modes can be undertaken in the shortest possible time frame because, in both instances it can be executed without the need for ground placement of the containers.

An additional, and important, consideration has to be taken into account. The initial position of the mobile parent cranes 101 over respective cells in the container ship A is not necessarily in alignment with the container cells in container feeder vessels or costal tug-barge systems B moored on the other side of the pier 114. If misalignment is under 2.5 feet or 0.75 meters on either side, a standard trolley/hoist/spreader can be designed to adjust for such transverse distances. When misalignment is greater that 2.5 feet or 0.75 meters in either direction, additional alternatives have to be considered:

1. As container feeder vessels become larger (they are already at 1,200 TEU capacity in the Far East), and coastal tug-barge systems become larger (they are already at 800 TEU capacity in the United States), one alternative that can be considered is a system of "warping mules". Warping mules have been used since the early 1900's on the Panama Canal. Modern warping mules can be installed along the side of the pier 114. It is now well within the state-of-the-art to design warping mules capable of moving, and aligning, even the largest container feeder vessels or costal tug-barge systems B.

2. A second alternative to be considered is to design the cells of the feeder vessel or coastal tug-barge system with the same horizontal clearance distances between cells as those on the container ship A. Once such a feeder vessel or coastal barge is securely moored at the right place on the side of pier 114, its cells, and those of the container ship A on the opposite side of pier 114, will be in alignment. All mobile parent quayside container cranes 101 working the container ship A will then be in direct alignment with the cells on the feeder vessel or coastal tug-barge systems B. The problem here, however, is that the number of containers coming out of a single cell of a large container ship A greatly exceeds the number of containers that a single cell can accommodate on a feeder vessel or tug-barge system B. Therefore moving the smaller vessel along the pier will still be required.

3. In order to minimize the number of movements feeder vessels or tug-barges have to make, another alternative can be considered. In FIGS. 5a and 5c, it will be noted that the trolley/hoist/spreader 105a on the boom 102 has to be able to drop (and raise) containers 108 onto (and from) the scanning deck/fixed platform 109 which is mounted on the platform bearing structure Z. It will be noted that the boom 103, supporting its trolley/hoist/spreader 106a, lies above the platform 109. In other words, the containers 108 have to pass through the boom 103. This, in turn, requires that the boom 103 be wide enough to accommodate such passages through it by the containers 108. However, the necessity of having to provide a much greater width in the boom 103, as against the boom 102, presents an opportunity to solve the misalignment problem referred to previously.

The optimum solution to the problem of misalignment between cells on either side of the pier 114 comes from making the width of the boom 103 wide enough to accommodate the machinery trolley/hoist/spreader 106a. Specifically, the boom 103 should be wide enough to accommodate a machinery trolley/hoist/spreader 106a capable of moving the containers 108 both in a transverse direction across the axis of the pier 114, and also longitudinally, (parallel) to the axis of the pier 114. A further design option, inherent in this invention, is to make the longitudinal traverse of the machinery trolley/hoist/spreader 106a capable of loading/unloading containers 108 to/from; two adjacent cells of the feeder vessels or tug-barge systems B.

As shown in FIGS. 5a and 5c, these embodiments of the invention, from a terminal operations standpoint, makes practical, and cost-efficient, the security scanning and direct transshipment of containers between container ships and other marine vessels moored on opposing sides of a pier and, more specifically, by enabling this function to be undertaken without the need for ground placement of any of the containers scanned or being transshipped.

Figure 7A:
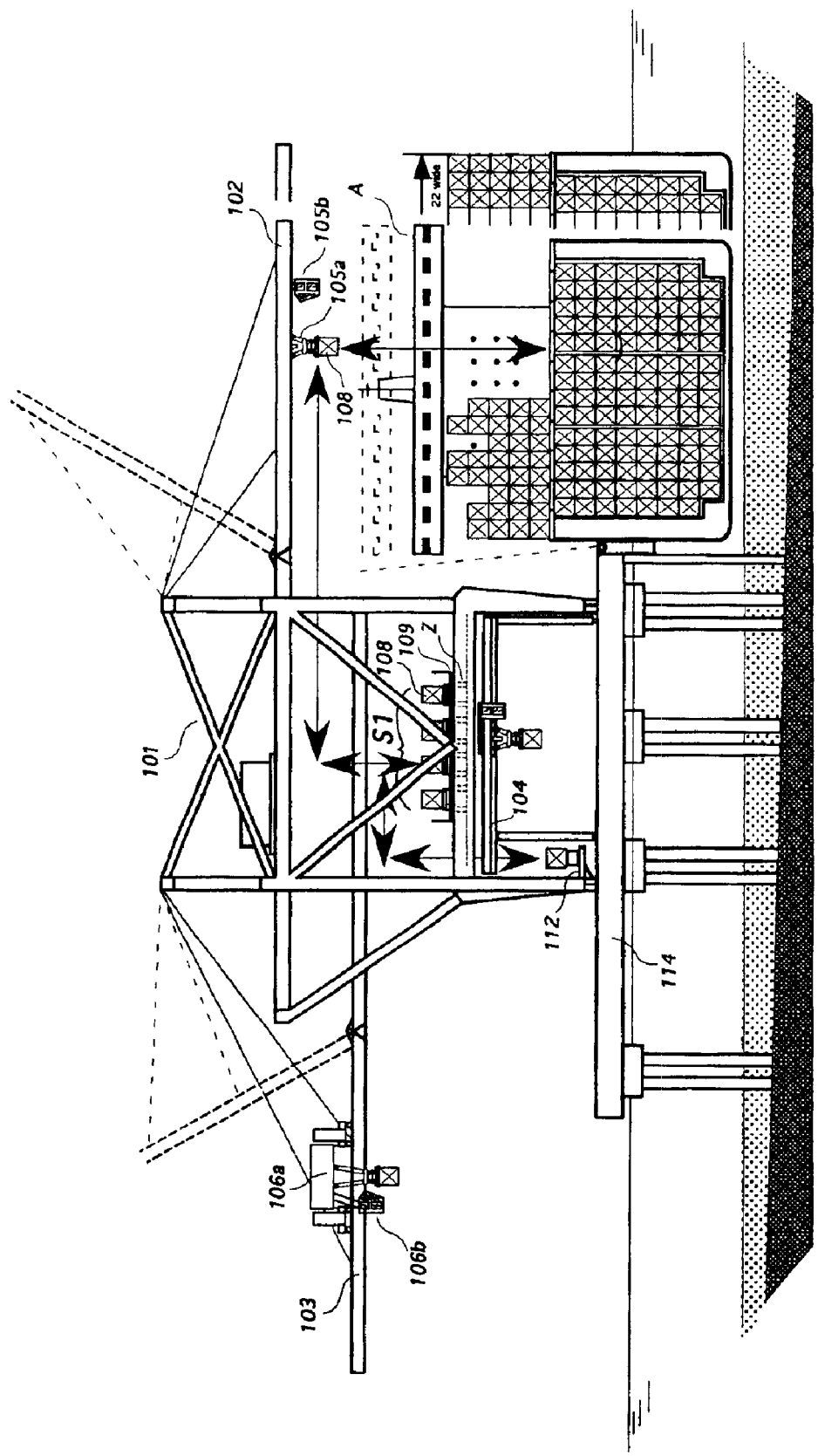
FIG. 7a and the enlarged FIG. 7b are explanatory elevational views, partly in section, of another embodiment of crane apparatus according to the present invention, showing the location of the container security scanning system S1.
Figure 7B:
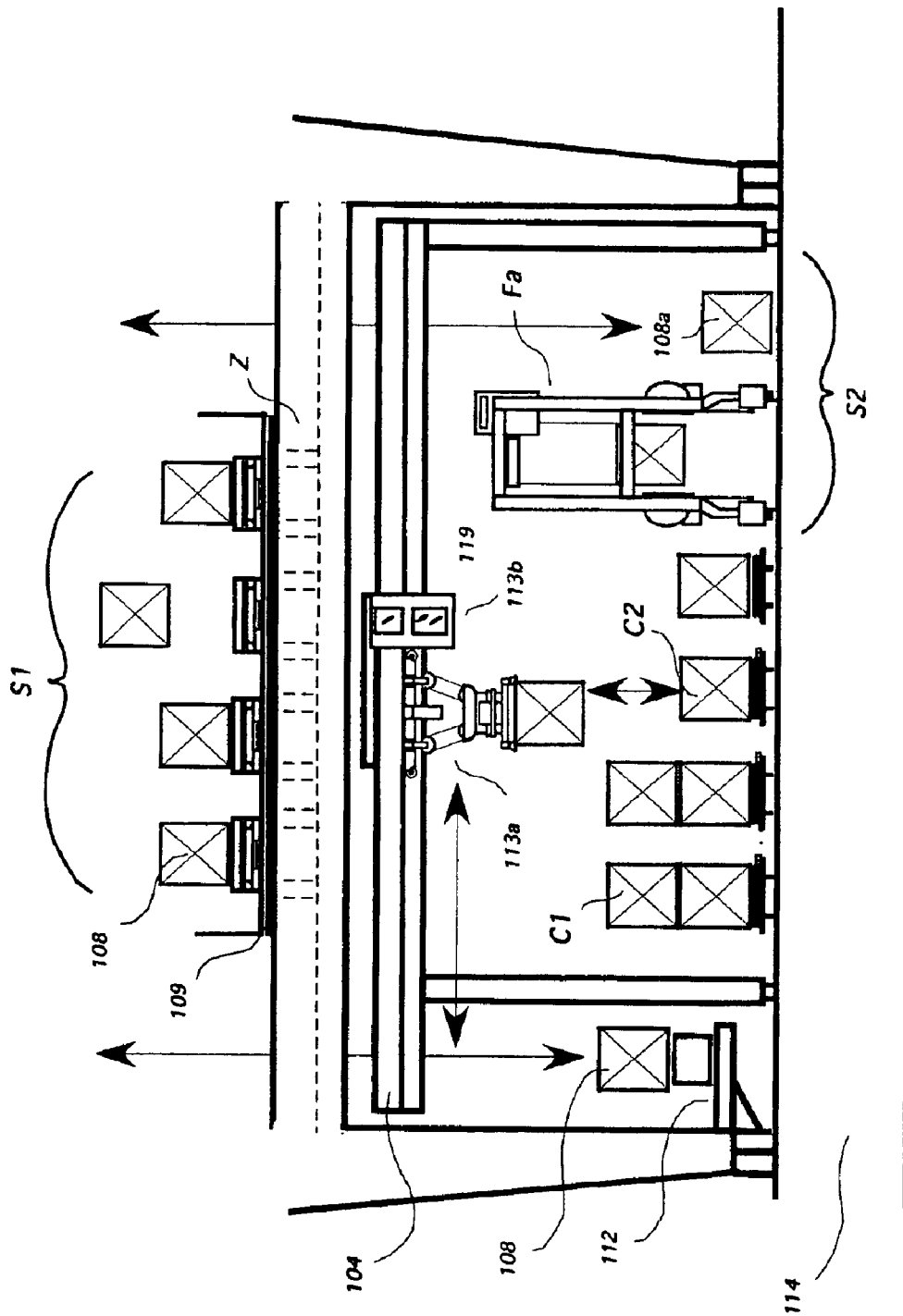

FIG. 7a together with FIG. 7b illustrate an embodiment of the crane apparatus of the present invention whereby mobile parent quayside container cranes 101 and their sibling RMG cranes 104 transship containers 108 between a container ship A and double-stack container rail-cars C1, and/or single-stack container rail-cars C2. The rail-cars, in both instances, comprise cuts of container unit-trains standing on the pier 114 immediately under the mobile parent quayside container cranes 101 and their sibling RMG cranes 104.

In this embodiment of the invention, part of the container unloading/loading cycle is shown in FIG. 7a, i.e., the trolley/spreader hoist 105a under the control of an operator stationed in the independently mounted operator control cabin 105b lifts a container 108 from the container ship A and transfers it to the scanning deck/fixed platform 109. Following scanning, the machinery trolley/hoist/spreader 106a mounted on boom 103 lifts the container 108 from the platform 109 and transfers it to the platform 112. The platform 112 is an integral structural part of the mobile parent quayside container crane 101 and is attached to the legs of the crane 101 on one side thereof.

The on-going part of the unloading/loading cycle is shown in the enlarged view in FIG. 7b. In FIG. 7b, the trolley/hoist/spreader 113a mounted on the sibling RMG crane 104 lifts the scanned container 108 from the container receiving platform 112 and transfers it to one of the double-stack C1, or single-stack C2, container rail-cars comprising cuts of container unit-trains on the pier 114 immediately under the cranes.

Figure 9:
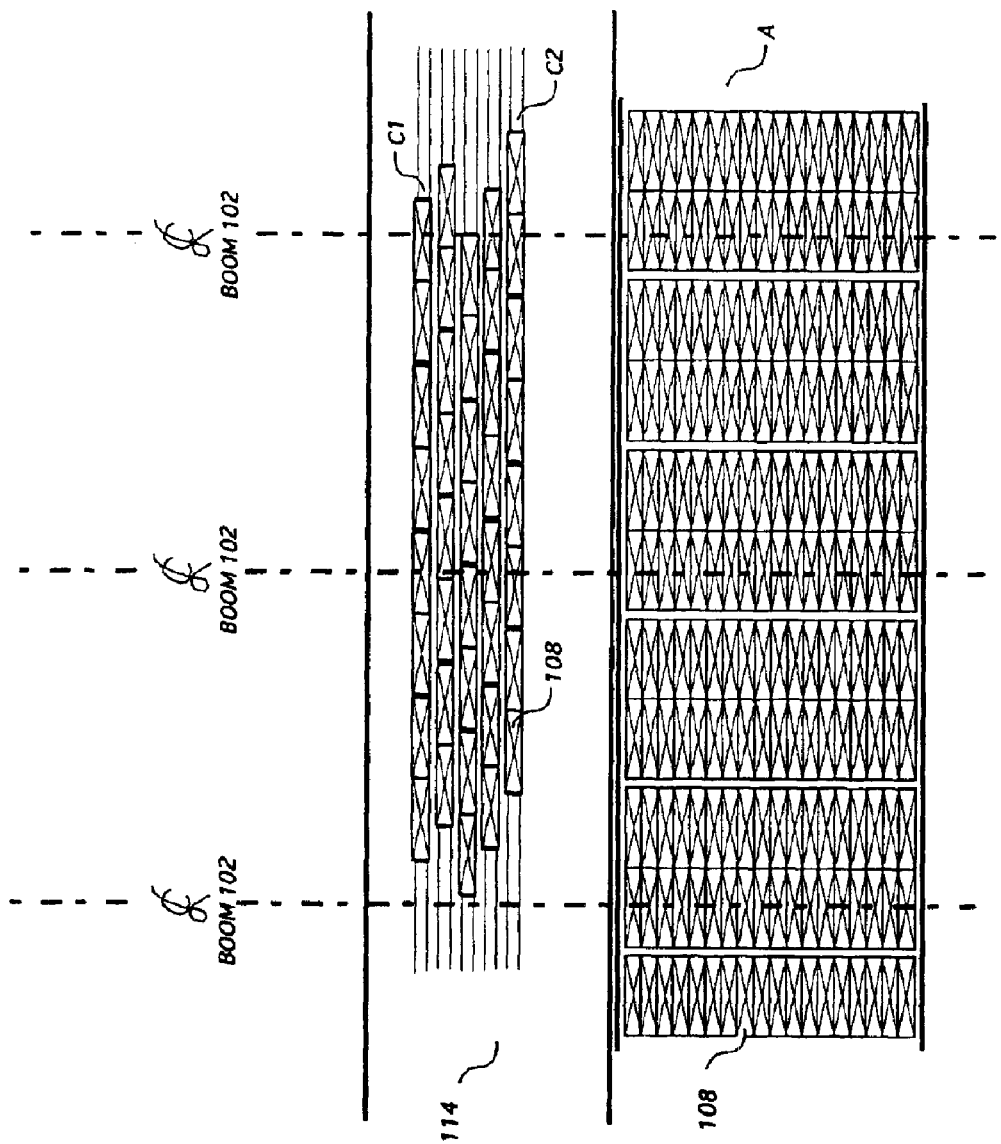
FIG. 9 is an explanatory plan view of a container ship alongside a pier, illustrating the manner in which the booms of several parent quayside container cranes are out of alignment with container rail-cars parked on the adjacent pier (or wharf).

The reason that only an independent sibling RMG crane 104 can properly execute this last transfer now becomes apparent and will be explained with reference to FIG. 9, which is a plan view of the pier 114. FIG. 9 shows a number of mobile parent quayside container booms 102 working to unload a container ship A and also shows, for example, five parallel rail tracks aligned under the cranes along the pier 114. On these five rail tracks, however, the position of individual rail-cars, either double-stack C1 or single stack C2, can be out of alignment with the booms 102 of the mobile parent cranes 101.

More specifically, as shown in FIG. 9, the booms 102 of the parent quayside container cranes 101 are shown aligned over the container cells of the ship A. At the same time, however, the crane booms 102 are seen to be out of direct alignment with the rail-cars C1 or C2 on the pier 114— especially when these rail-cars, as shown, comprise different cuts of container unit-trains. Because of this misalignment, the direct loading of rail-cars by the parent quayside cranes 101 (without the need for ground placement) can only be achieved if these cranes were to make continuous movements back and forth along the dock. This explains why an independently rail-mounted sibling RMG crane 104 associated with its parent quayside crane 101 and able to move longitudinally up and down the dock, is needed if such continuous, and uneconomic, short movements by parent quayside cranes are to be eliminated.

For this reason, only the independent sibling RMG cranes 104 have the full longitudinal and transversal range to reach all drop-off positions under their parent cranes 101. By their independence, the sibling RMG cranes 104 can transfer the containers 108 longitudinally, and transversally, along and across the pier 114 to any position of the rail-cars C1 and C2, independently of any fixed position of their parent cranes 101.

The sibling RMG cranes 104 operating from under, and out to the sides of, their mobile parent quayside container cranes 101, however, must be controllable so that they do not collide with either containers 108 being lowered to (or raised from) the platform 112 by their parent cranes 101 or other sibling RMG cranes 104 working under, and out to the sides of, their mobile parent quayside container cranes 101. This can be achieved by standard state-of-the-art automated control systems controlling the position of each sibling RMG crane 104 as it must relate to the position of its parent crane 101 and the cranes 101 and 104 on either side of it.

From an operational standpoint, the following trend in container terminal logistics is important. Specifically, as container ships continue to increase in size, the need also increases to unload and load these vessels as quickly as possible. Direct loading of containers onto other modes is the most efficient and cost-effective way to do this. However such direct loading dictates that each on-going mode is loaded randomly. For example, all rail-bound containers should be loaded randomly, and as quickly as possible after scanning, on any available vacant rail-car immediately under the cranes. Sorting by ultimate destination should not be attempted at the dock-side. Once cuts of rail-car unit-trains are loaded they should be moved as quickly as possible to a point within, or near, the terminal, where the cuts can be formed into container unit-trains. Once these unit-trains are formed they should be moved, also as quickly as possibly, away from the terminal area to the nearest interior marshalling yard. It is at these key interior marshalling yards where consolidation of the containers by ultimate destination should take place.

At least five of the world's largest container ports are already building rail systems and marshalling yards back from their main container terminals to achieve essential parts of the needed new ship-to-rail container logistics systems—Rotterdam and Antwerp in Europe, Los Angeles and Long Beach in the United States and Deltaport (Vancouver) in Canada.

The drive to do this is coming largely from the increasing truck congestion in and around these port cities. These new rail systems are multi-billion dollar investments, as attested to by the Alameda Rail Corridor project in California at $2.0 billion, and the equally ambitious rail line and tunnels project being built to connect the Ruhr with the port of Rotterdam via the interior container marshalling yard at Barendrecht in the Netherlands.

Once these, and similar, rail systems are completed, the only missing link will be to provide the direct loading and unloading of containers to and from cuts of rail-car unit-trains positioned immediately under the dockside cranes. An object of the present invention is to provide this essential final link in the new container supply-chain logistics systems that, of necessity, are having to be developed.

Figure 6B:
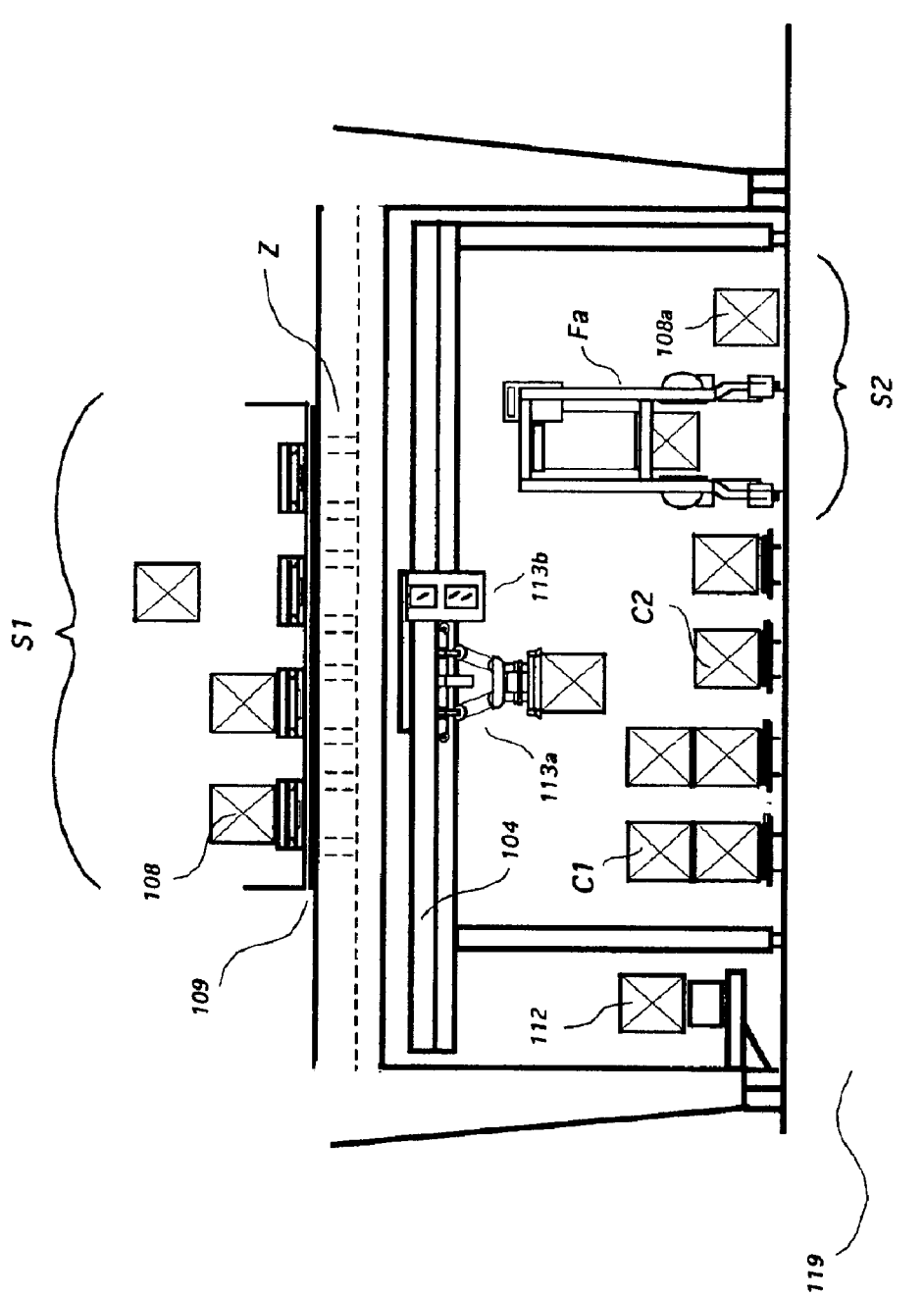
FIG. 6b is an enlarged explanatory view of the sibling crane of FIG. 6a, showing in more detail the location of the container security system S1.

FIGS. 6a and 6b illustrate the same embodiments of the crane apparatus of the invention as shown in FIGS. 5 and 7, the only difference being that, instead of the pier 114 being constructed on, for example, the slab, plinth and piling principle, the foundation is constructed using caissons 119.

The heavy loads, both static and dynamic, created by, for example, five mobile parent quayside container cranes 101 operating at maximum cycle speed while unloading/loading a large container ship A, under certain conditions, may be better compensated for by a crane platform comprised of large, demountable, ballastable, trimmable, concrete caissons 119. Such caisson platforms 119, and their use, are described in detail in my U.S. Pat. No. 6,017,617, which is incorporated herein by reference.

FIGS. 8, 10 and 11 show embodiments of the crane apparatus of the invention installed on wharves or bulkhead wharves 120. FIG. 8 shows a typical wharf or bulkhead wharf 120 built by standard construction. In this case, for example, the dock front is shown as being constructed by the plinth, slab and piling method 114. FIG. 10 shows, for example, the wharf or bulkhead wharf 120 constructed using caissons 119 together with a concrete apron 114a.

One difference between the embodiments of the invention shown in FIGS. 8, 10 and 11, as against that shown in FIG. 1, is that the fixed platform for storing re-stow containers is not required. With the added land available back from the dock face and cranes, the option exists as to whether to re-stow containers 116 on a fixed platform or on the ground.

Also with added backland being available with a wharf or bulkhead wharf installation 120, and as shown in FIGS. 8, 10 and 11, it is possible that a wider range of container moving-and-handling equipment can be utilized. The more restricted real estate available with piers 114 results in the over-the-ground equipment that can be used being limited as to type and numbers. In the case of wharves and bulkhead wharves 120, as seen in FIGS. 8 and 10, other types of equipment can be used, especially those that require more room to maneuver, such as multi-trailer sets (MTS) E, rubber-tired gantries (RTGs) G, and straddle carriers F. Also readily usable in this category, but not shown, would be reach-stackers and top-picks.

All the scanning and direct transshipment functions that the parent quayside container cranes 101 and their sibling RMG cranes 104 are described as being able to execute in the embodiments of FIGS. 5 and 7 on piers 114, are capable of being executed on the wharves and bulkhead wharves 120 in the embodiments of FIGS. 8, 10 and 11. The crane apparatus of the present invention will be just as cost-effective and as efficient in terms of lifts per hour, and cycle time, whether installed on a pier, a wharf or a bulkhead wharf.

FIG. 11 differs from FIG. 10 only in that it shows the installation of automated overhead bridge cranes (OBCs) H for stacking containers in the terminal. The installation of the OBCs H reduces the handling cost per container and allows for greatly increased stacking density per acre. Recent developments in this area in Singapore, Hong Kong and Antwerp, where backland is relatively restricted, have seen the installation of OBC systems resulting in a terminal efficiency in the order of 11,000 TEUs/acre/year. For comparison purposes, the efficiency of the Port of NY/NJ container terminals is in the order of 1,250 TEUs/acre/year.

Ideally, as shown in FIG. 11, the machinery trolley/hoist/spreader 106a, under the control of the operator in the operator control cabin 106b, would drop the container 108 to the ground behind the backlegs of the cranes. From there, 1-over-1 shuttle straddle carriers F (such as those of several manufacturers including Kalmar Industries) would only have to move the containers 108 a short distance to a point where the OBCs H could pick them up and transfer them to the stacks. The combined efficiencies of the crane apparatus of the present invention, together with automated overhead bridge cranes H in a stacking area as close as possible to these cranes, would result in a most efficient and cost-effective marine container terminal layout and design, especially in areas where backland is restricted.

Figure 12:
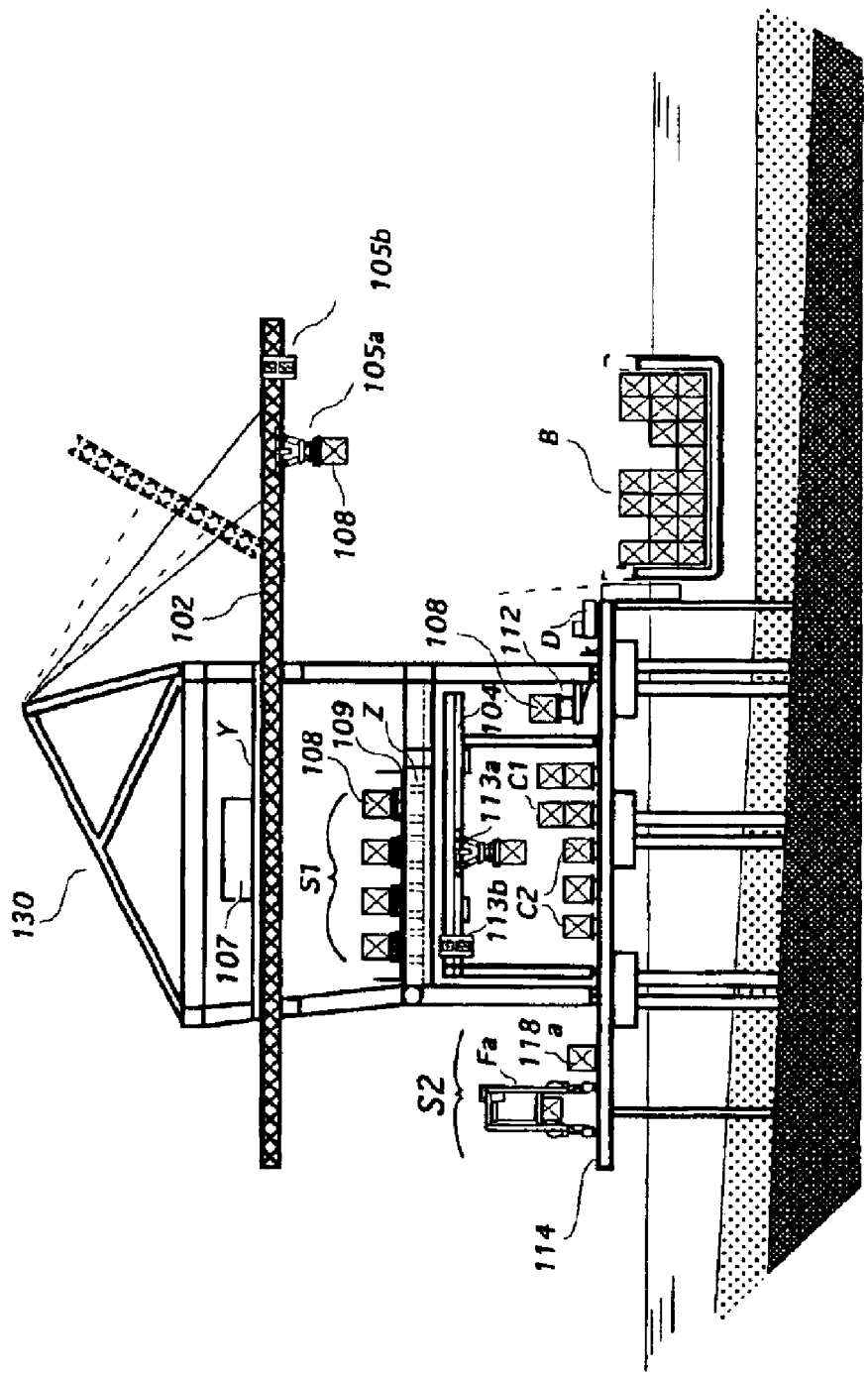
FIG. 12 is an explanatory elevational view, partly in section, of a further embodiment of crane apparatus according to the present invention, showing a smaller version of crane apparatus equipped with the container security scanning system S1 and showing the scanning and transshipping of containers from a container barge (or feeder vessel) directly to the railway mode such as, for example in this case, to single-stack and double-stack rail-cars without the necessity for ground placement.

FIG. 12 shows an embodiment of the crane apparatus of the invention which is smaller, and lower in height, than the embodiments described heretofore. This embodiment of crane apparatus has parent quayside container cranes 130 equipped with container security scanning systems S1 and sibling RMG cranes 104 and is designed to scan and transship containers directly between container feeder vessels and/or barges B and double-stack C1, and/or single-stack C2, container rail-cars that are part of cuts of container unit-trains positioned immediately under the cranes. As it does not have to transship containers 108 from large container vessels A, as shown in FIGS. 5–8 and 10 and 11, this combination of cranes can be of a far more compact design and therefore cost considerably less to construct.

This embodiment of the invention can also be installed on piers 114, as shown in FIG. 12, or on a wharf or bulkhead wharf, similar to those shown in FIGS. 8, 10 and 11.

While the present invention has been described with reference to presently preferred embodiments thereof, other embodiments as well as obvious variations and modifications to all the embodiments will be readily apparent to those of ordinary skill in the art. The present invention is intended to cover all such embodiments, variations and modifications that fall within the spirit and scope of the appended claims.

I claim:

1. Crane apparatus installed on a foundation situated in water, comprising: a crane movable along the foundation for unloading containers from a vessel docked along the foundation and placing the containers on a deck of the crane and for transferring the containers from the deck to another location;

and a container security scanning system for scanning the containers while the containers are on the deck to determine the presence of radioactive material in the containers.

2. Crane apparatus according to claim 1; wherein the deck is located at the portal girder level of the crane.

3. Crane apparatus according to claim 1; wherein the container security scanning system comprises one or more scanning units disposed on the deck, each scanning unit having a scanning device movable beneath a container on the deck for scanning the container and detecting whether radioactive material is present in the container.

4. Crane apparatus according to claim 3; wherein each scanning unit comprises at least one scanning platform disposed on the deck for supporting thereon a container such that a bottom of the container is vertically spaced from the deck, the scanning device being movable beneath the container in the space between the bottom of the container and the deck.

5. Crane apparatus according to claim 4; wherein the scanning device of each scanning unit is movable along rails supported by support members.

6. Crane apparatus according to claim 5; wherein the support members are connected to the scanning platform.

7. Crane apparatus according to claim 5; wherein the support members are disposed on the deck.

8. Crane apparatus according to claim 3; wherein each scanning unit comprises at least one scanning platform disposed on the deck for supporting thereon a container, the scanning device being movable beneath the container in a space between an underside of the scanning platform and the deck.

9. Crane apparatus according to claim 8; wherein each scanning unit includes a set of rails along which moves the scanning device, and support members supporting the rails in the space between the underside of the scanning platform and the deck.

10. Crane apparatus according to claim 8; wherein at least one of the scanning units comprises two scanning platforms disposed on the deck in end-to-end relation for jointly supporting thereon one container or individually supporting thereon separate containers, the scanning device being movable beneath the container or containers in a space between an underside of the scanning platforms and the deck.

11. Crane apparatus according to claim 8; wherein each of the scanning units comprises two scanning platforms disposed on the deck in end-to-end relation for jointly supporting thereon one container or individually supporting thereon separate containers, the scanning device of each scanning unit being movable beneath the container or containers in a space between an underside of the scanning platforms and the deck.

12. Crane apparatus according to claim 4; wherein each scanning platform comprises a plurality of longitudinal support beams connected to a plurality of transverse support beams to define a platform for receiving thereon the container, and a plurality of legs connected to the platform for supporting the platform in an elevated-position on the deck, the scanning device being movable beneath the platform.

13. Crane apparatus installed on a foundation situated in water, comprising: a crane movable along the foundation for unloading a container from a vessel docked along the foundation and placing the container on a deck of the crane and for transferring the container from the deck to another location; and a scanning device movable beneath the container while the container is on the deck to detect whether radioactive material is present in the container.

14. Crane apparatus according to claim 13; further comprising a scanning platform disposed on the deck and on which the container is placed by the crane, the scanning platform supporting the container in an elevated position on the deck, and the scanning device being movable beneath the container in a space between an underside of the scanning platform and the deck to scan the container and detect whether radioactive material is present in the container.

15. Crane apparatus according to claim 14; further including a set of rails supported by support members in the space between the underside of the scanning platform and the deck, the scanning device being movable along the rails beneath the underside of the scanning platform.

16. Crane apparatus according to claim 15; wherein the support members are connected to the scanning platform.

17. Crane apparatus according to claim 15; wherein the support members are disposed on the deck.

18. Crane apparatus according to claim 14; wherein the scanning platform comprises a plurality of longitudinal support beams connected to a plurality of transverse support beams to define a platform for receiving thereon the container, and a plurality of legs connected to the platform for supporting the platform in an elevated position on the deck, the scanning device being movable beneath the platform.

19. Crane apparatus according to claim 13; further comprising two scanning platforms disposed on the deck in end-to-end relation for jointly supporting thereon one container or individually supporting thereon separate containers, the scanning platforms supporting the container or containers in an elevated position on the deck, and the scanning device being movable beneath the container or containers in a space between an underside of the scanning platforms and the deck.

20. Crane apparatus according to claim 13; wherein the scanning device includes a gamma ray detector and a neutron detector.

21. Crane apparatus according to claim 13; wherein the scanning device includes at least one of a gamma ray detector and a neutron detector.

22. Crane apparatus according to claim 13; wherein the deck is located at the portal girder level of the crane.

23. Crane apparatus installed on a foundation situated in water for directly transshipping containers from a vessel moored alongside the foundation to a land transportation mode without necessity of ground placement of the containers, the crane apparatus comprising: a parent crane mounted on the foundation and displaceable therealong for unloading containers from a vessel moored alongside the foundation and placing the containers on a deck of the parent crane and for transferring containers from the deck to a platform of the parent crane; a container security scanning system for scanning the containers while on the deck to determine whether radioactive material is present in the containers; and a sibling crane mounted on the foundation and displaceable therealong beneath the parent crane and independently of displacement of the parent crane for loading containers from the platform to a land transportation mode.

24. Crane apparatus according to claim 23; wherein the deck is located at the portal girder level of the crane.

25. Crane apparatus according to claim 23; wherein the container security scanning system comprises one or more scanning units disposed on the deck, each scanning unit having a scanning device movable beneath a container on the deck for scanning the container and detecting whether radioactive material is present in the container.

26. Crane apparatus according to claim 25; wherein each scanning unit comprises at least one scanning platform disposed on the deck for supporting thereon a container such that a bottom of the container is vertically spaced from the deck, the scanning device being movable beneath the container in the space between the bottom of the container and the deck.

27. Crane apparatus according to claim 26; wherein the scanning device of each scanning unit is movable along rails supported by support members.

28. Crane apparatus according to claim 27; wherein the support members are connected to the scanning platform.

29. Crane apparatus according to claim 27; wherein the support members are disposed on the deck.

30. Crane apparatus according to claim 25; wherein each scanning unit comprises at least one scanning platform disposed on the deck for supporting thereon a container, the scanning device being movable beneath the container in a space between an underside of the scanning platform and the deck.

31. Crane apparatus according to claim 30; wherein each scanning unit includes a set of rails along which moves the scanning device, and support members supporting the rails in the space between the underside of the scanning platform and the deck.

32. Crane apparatus according to claim 30; wherein at least one of the scanning units comprises two scanning platforms disposed on the deck in end-to-end relation for jointly supporting thereon one container or individually supporting thereon separate containers, the scanning device being movable beneath the container or containers in a space between an underside of the scanning platforms and the deck.

33. Crane apparatus according to claim 30; wherein each of the scanning units comprises two scanning platforms disposed on the deck in end-to-end relation for jointly supporting thereon one container or individually supporting thereon separate containers, the scanning device of each scanning unit being movable beneath the container or containers in a space between an underside of the scanning platforms and the deck.

34. Crane apparatus according to claim 26; wherein each scanning platform comprises a plurality of longitudinal support beams connected to a plurality of transverse support beams to define a platform for receiving thereon the container, and a plurality of legs connected to the platform for supporting the platform in an elevated position on the deck, the scanning device being movable beneath the platform.

35. Crane apparatus according to claim 23; wherein the land transportation mode is a rail-road mode.

36. Crane apparatus according to claim 23; wherein the land transportation mode is a road mode.

37. A method for screening containers for radioactive material during transshipment of the containers by a crane from a marine vessel to another location, comprising the steps of:

using a crane to transfer containers from a marine vessel to a deck of the crane;

scanning the containers while on the deck to determine whether radioactive material is present in the containers; and using the crane to transfer the containers from the deck to either a first location or a second location depending on whether or not radioactive material is determined to be present in the containers.

38. A method according to claim 37; wherein the scanning step comprises scanning a scanning device beneath the containers while the containers are on the deck.

39. A method according to claim 38; wherein the scanning device detects for gamma ray emissions and/or neutron emissions.

40. A method according to claim 37; wherein the first using step comprises using the crane to transfer containers from the marine vessel to a scanning platform on the deck; the scanning step comprises scanning a scanning device beneath the containers while the containers are on the scanning platform to determine whether radioactive material is present in the containers; and the second using step comprises using the crane to transfer the containers from the scanning platform on the deck to either the first or second location depending on whether or not radioactive material is determined to be present in the containers.

41. A method according to claim 40; wherein the scanning step comprises scanning a scanning device beneath the containers while the containers are on the deck.

42. A method according to claim 37; wherein the first location comprises a transportation corridor for expediting movement of containers containing radioactive material, and the second location is one serviced by a land transportation mode.

43. A method according to claim 42; wherein the land transportation mode comprise rail-cars.

44. A method according to claim 42; wherein the land transportation mode comprise trailer-trucks.

45. A method according to claim 42; wherein the second using step includes using the crane to directly transfer containers from the deck to the second location without ground placement of the containers.

46. A method according to claim 45; wherein the second location is one serviced by a land transportation mode.

47. A method according to claim 46; wherein the land transportation mode comprise rail-cars.

48. A method according to claim 44; wherein the land transportation mode comprise trailer-trucks.

49. A method of retrofitting a crane to enable screening of containers for radioactive material during transshipment of the containers by the crane from a marine vessel to another location, comprising the steps of:

providing a scanning platform on a deck of the crane so that the crane can transfer containers from a marine vessel to the scanning platform; and providing a movable scanning device beneath an underside of the scanning platform so that the scanning device can undergo scanning movement beneath a container on the scanning platform to detect whether radioactive material is present in the container before the container is transferred by the crane from the scanning platform to another location.

50. A method according to claim 49; wherein the scanning device is able to detect gamma ray emissions and/or neutron emissions.

51. A method according to claim 49; wherein the step of providing a scanning platform on a deck of the crane comprises installing a deck at the portal girder level of the crane if one is not present at that location, and providing the scanning platform on the deck located at the portal girder level of the crane.

52. A method according to claim 49; wherein the step of providing a scanning platform comprises providing two scanning platforms in end-to-end relation on the deck of the crane so that the crane can transfer one container to both scanning platforms or separate containers to each scanning platform; and the step of providing a movable scanning device comprises providing a movable scanning device beneath an underside of both scanning platforms so that the scanning device can undergo scanning movement beneath either one container on both scanning platforms or separate containers on each scanning platform.

\* \* \* \* \*